United States Patent
Fushimi et al.

(10) Patent No.: US 7,255,450 B2
(45) Date of Patent: *Aug. 14, 2007

(54) PROJECTION TYPE DISPLAY APPARATUS, REAR PROJECTOR AND MULTI-VISION SYSTEM

(75) Inventors: Yoshimasa Fushimi, Osaka (JP); Yoshihiro Masumoto, Hyogo (JP); Mitsuhiro Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/533,598

(22) Filed: Sep. 20, 2006

(65) Prior Publication Data

US 2007/0013880 A1 Jan. 18, 2007

Related U.S. Application Data

(62) Division of application No. 11/130,901, filed on May 17, 2005, now Pat. No. 7,134,757, which is a division of application No. 10/467,812, filed as application No. PCT/JP02/10152 on Sep. 30, 2002, now Pat. No. 6,966,658.

(30) Foreign Application Priority Data

Oct. 1, 2001 (JP) ............................. 2001-305019

(51) Int. Cl.
G02B 21/20 (2006.01)
G02B 21/26 (2006.01)
G02F 1/1335 (2006.01)

(52) U.S. Cl. .................... 353/102; 353/30; 353/94; 349/5; 349/798

(58) Field of Classification Search .................. 353/30, 353/31, 37, 38, 77, 79, 94, 98, 99, 102; 349/5; 348/744, 798; 344/744, 798
See application file for complete search history.

(56) References Cited

U.S. PATENT DOCUMENTS 4,420,219 A 12/1983 Muchel (Continued)

FOREIGN PATENT DOCUMENTS

JP 10/232379 9/1998

(Continued)

OTHER PUBLICATIONS

Toyota et al., "Fabrication of Microcone Array for Antireflection Structured Surface Using Metal Dotted Pattern", Jpn J. Appl. Phys., vol. 40, 2001, pp. L747-L749.

*Primary Examiner*—Melissa Jan Koval
(74) *Attorney, Agent, or Firm*—Hamre, Schuman, Mueller & Larson, P.C.

(57) ABSTRACT

The present invention provides a small projection type display apparatus capable of suppressing an optical path of incident light and an optical path of output light in a reflection type light valve from being overlapped with each other and obtaining a projected image of high quality; a rear projector and a multi-vision system using the same. The lens element 5 is composed of one piano-convex lens, and is placed between the reflection type light valve and the projection lens system with a convex surface directed to the projection lens system. The illumination light passes through the lens element to illuminate the reflection type light valve, and the modulated light output from the reflection type light valve passes through the lens element to be incident upon the projection lens system.

19 Claims, 19 Drawing Sheets

U.S. PATENT DOCUMENTS

| | | |
|---|---|---|
| 5,564,811 A | 10/1996 | Lim .......................... 353/99 |
| 6,076,931 A | 6/2000 | Bone et al. |
| 6,118,501 A | 9/2000 | Ohzawa |
| 6,129,437 A | 10/2000 | Koga et al. |
| 6,142,633 A | 11/2000 | Takahara et al. |
| 6,181,386 B1 | 1/2001 | Knox |
| 6,193,376 B1 | 2/2001 | Hayashi et al. |
| 6,231,192 B1 | 5/2001 | Konno et al. |
| 6,439,726 B1 | 8/2002 | Piehler |
| 6,542,204 B1 | 4/2003 | Ohzawa et al. |
| 6,652,105 B1 | 11/2003 | Peterson et al. |
| 6,781,563 B2 | 8/2004 | Nishio et al. |
| 2004/0201824 A1 | 10/2004 | Wada et al. |

FOREIGN PATENT DOCUMENTS

| | | |
|---|---|---|
| JP | 10/301057 | 11/1998 |
| JP | 10/307277 | 11/1998 |
| JP | 11/249069 | 11/1999 |
| JP | 2000-39585 | 4/2000 |
| JP | 2000-98272 | 4/2000 |
| JP | 2000-221446 | 8/2000 |
| JP | 2000-122805 | 4/2002 |
| JP | 2002-521704 | 7/2002 |
| JP | 2002-250894 | 9/2002 |
| JP | 2002-296539 | 10/2002 |
| WO | 98/29773 | 7/1998 |
| WO | 99/26103 | 5/1999 |

PROJECTION TYPE DISPLAY APPARATUS, REAR PROJECTOR AND MULTI-VISION SYSTEM

This application is a divisional of application Ser. No. 11/130,901, filed May 17, 2005, now U.S. Pat. No. 7,134,757 which is a divisional of application Ser. No. 10/467,812, filed Aug. 12, 2003, now U.S. Pat. No. 6,966,658 issued Nov. 22, 2005 which applications are incorporated herein by reference.

TECHNICAL FIELD

The present invention relates to a projection type display apparatus, and a rear projector and a multi-vision system that use the projection type display apparatus.

BACKGROUND ART

As a method for obtaining a large screen image, it is well known conventionally that an optical image is formed on a reflection type light valve in accordance with a video signal, and the optical image is irradiated with light to be projected on a screen in a magnified state by a projection lens system. If a reflection type light distribution correction element for forming an optical image by controlling the traveling direction of light in accordance with a video signal is used as the reflection type light valve, a projected image with a more efficient light use and a higher brightness can be displayed.

As the reflection type light valve, a DMD (Digital Micro Mirror Device) is being given attention. The DMD has a configuration in which a plurality of minute reflection mirrors (hereinafter, referred to as "micro mirrors") are disposed two-dimensionally on a silicon substrate, and each micro mirror constitutes a pixel. Each micro mirror is configured so as to move like a seesaw in a range of ±10° by two rotation spindles provided in a diagonal direction at a diagonal position of a pixel. For example, it is assumed that the state where a micro mirror is tilted at +10° is ON, and the state where a micro mirror is tilted at −10° is OFF. The DMD tilts each micro mirror at +10° or −10° in accordance with a video signal, thereby controlling the output direction of a light beam to form an optical image.

FIG. 17 shows an operation state of micro mirrors constituting the respective pixels of a conventional DMD. FIG. 17 shows a cross-section taken along a surface perpendicular to a rotation spindle of each micro mirror of the DMD. The counterclockwise direction corresponds to a rotation positive direction of a micro mirror. In FIG. 17, reference numerals 191 to 196 denote micro mirrors that constitute the respective pixels. Reference numeral 197 denotes a part of a projection lens system.

In the example shown in FIG. 17, the micro mirrors 191, 193, and 196 are tilted at +10° (in a counterclockwise direction) with respect to a reference surface 190 of the reflection type light valve (DMD), whereby they are in an ON state. Therefore, incident light 198 reflected from the micro mirrors 191, 193, and 196 is incident upon the projection lens system 197.

On the other hand, the micro mirrors 192, 194, and 195 are tilted at −10° (in a clockwise direction) with respect to the reference surface 190 of the reflection type light valve, whereby they are in an OFF state. Therefore, the incident light 198 reflected from the micro mirrors 192, 194, and 195 is not incident upon the projection lens system 197. Such a DMD has useful characteristics, i.e., it can use natural light, and has a high light use efficiency and a high response speed, compared with a liquid crystal panel using polarized light.

WO 98-29773 shows a configuration example of an optical system of a projection type display apparatus using a DMD as a reflection type light valve. FIG. 18 shows a schematic configuration of a projection type display apparatus using a conventional DMD. FIG. 19 shows a portion in the vicinity of the DMD shown in FIG. 18 in a magnified state. FIGS. 18 and 19 show cross-sections taken along a surface perpendicular to a rotation spindle of each micro mirror of the DMD.

First, a description will be made with reference to FIG. 18. A light source 201 is composed of a concave mirror 201b and a lamp 201a. The concave mirror 201b is an elliptical mirror, which is formed by vapor-depositing an optical multilayer film that transmits infrared light and reflects visible light on an inner surface of a glass substrate. The lamp 201a is disposed so that the center of its illuminator is positioned at a first focal point (not shown) of the concave mirror 201b.

Light radiated from the lamp 201a is reflected from the concave mirror 201b, and travels to a second focal point (not shown) of the concave mirror 201b to form an illuminator image at the second focal point. Furthermore, the light passing through the second focal point passes through lens arrays 202a and 202b successively to be split into a plurality of luminous fluxes. Thereafter, the luminous fluxes are incident upon a relay lens 203 to be overlapped with each other. The lens arrays 202a and 202b are composed of a plurality of lens elements with a positive power.

The light output from the relay lens 203 is reflected from a total reflection mirror 204 to be incident upon a total reflection prism 208 via a field lens 205. The total reflection prism 208 is composed of two single prisms 208a and 208b spaced by an air layer 209. Reference numeral 207 denotes a projection lens system.

Next, a description will be made with reference to FIG. 19. Incident light 209a to 209c that is incident upon the total reflection prism 208 is totally reflected from an interface between the single prism 208b and the air layer 209 to travel to the reflection type light valve 206. The reflection type light valve 206 controls the traveling direction of light in accordance with a video signal to form an optical image.

Reflected light 210a to 210c from the reflection type light valve 206 is output as luminous fluxes having a principal ray perpendicular to a display region of the reflection type light valve 206, passes through the total reflection prism 208 without being reflected from the interface between the single prism 208b or 208a and the air layer 209, and is incident upon the projection lens system 207 (see FIG. 18). As a result, the optical image on the reflection type light valve 206 is projected on a screen in a magnified state by the projection lens system 207.

Thus, when the projection type display apparatus shown in FIGS. 18 and 19 is used, the optical path of illumination light can be prevented from being overlapped with that of projected light, and the quality of a projected image can be enhanced. Furthermore, the size of the projection lens system can be kept from being enlarged.

However, in the projection type display apparatus shown in FIGS. 18 and 19, the total reflection prism 208 is required for separating light into illumination light and projected light. This leads to an increase in cost. Furthermore, the total reflection prism 208 includes a minute air layer, so that the resolution characteristics of the projection lens system 207 are influenced largely by the tolerance of the air layer.

In order to solve the above-mentioned problem, JP 2000-98272 A discloses a configuration in which a projection lens system is designed as a non-telecentric type, and illumination is generated in accordance therewith.

FIG. 20 shows a schematic configuration of a conventional projection type display apparatus in which a projection lens system is designed as a non-telecentric type. FIG. 21 shows a portion in the vicinity of a reflection type light valve shown in FIG. 20 in a magnified state. In FIGS. 20 and 21, a DMD is used as the reflection type light valve. FIGS. 20 and 21 show a cross-section taken along a surface perpendicular to a rotation spindle of each micro mirror of the DMD.

As shown in FIG. 20, a light source 211 is composed of a lamp 211a and a concave mirror 211b in the same way as the light source shown in FIG. 18. The lamp 211a and the concave mirror 211b are the same as those shown in FIG. 18. The lamp 211a also is disposed so that the center of its illuminator is positioned at a first focal point f1 of the concave mirror 211b. In the same way as the example shown in FIG. 18, light radiated from the lamp 211a is reflected from the concave mirror 211b to form an illuminator image at a second focal point f2. The light passing through the second focal point f2 is incident upon a rod lens 212 to be made uniform. The illumination light that has been made uniform by the rod lens 212 passes through a relay lens 213.

As shown in FIG. 21, the illumination light passing through the relay lens 213 passes through an output pupil 217 of an illumination optical system to be incident upon a reflection type light valve 214 at a predetermined incident angle. The reflection type light valve 214 controls the traveling direction of light in accordance with a video signal to form an optical image. The incident light 215a to 215c to the reflection type light valve 214 is reflected respectively at predetermined angles, and reflected light 216a to 216c is incident upon an entrance pupil 218 of a projection lens system 219.

Furthermore, in the projection type display apparatus shown in FIGS. 20 and 21, a projection lens system of a non-telecentric type is used as the projection lens system 219. Therefore, an optical image formed on the screen by the reflection type light valve 214 can be projected in a magnified state without using a total reflection prism. Thus, it is considered that the cost of the projection type display apparatus shown in FIGS. 20 and 21 can be decreased more than that of the projection type display apparatus shown in FIG. 18.

The reflection type light valve 214 is configured so that the normal directions of the reflection surfaces of micro mirrors become constant over the display region. Therefore, in the configuration of the projection type display apparatus shown in FIGS. 20 and 21, when the optical axis of the reflection type light valve 214 is substantially matched with that of the projection lens system, the optical paths of the incident light 215a to 215c are overlapped with those of the reflection light 216a to 216c. Because of this, as shown in FIGS. 20 and 21, the optical axis of the projection lens system 219 is offset from that of the reflection type light valve 214, whereby the incident light 215a to 215c is separated from the reflected light 216a to 216c.

However, in the projection type display apparatus shown in FIGS. 20 and 21, the projection lens system 219 projects an image with its optical axis shifted from the optical axis of the reflection type light valve 214. Therefore, in order to obtain a satisfactory image with uniform illumination, it is required to enlarge an effective display region. Consequently, the projection type display apparatus shown in FIGS. 20 and 21 has a problem in that an optical system is enlarged, resulting in an increase in cost. There also is a problem in that front projection cannot be performed.

Furthermore, JP 11(1999)-249069 A discloses a projection type display apparatus in which a condenser lens constituting a part of a projection lens system is disposed immediately before a display region of a reflection type light valve. In this projection type display apparatus, illumination light is refracted by the condenser lens to be incident upon the reflection type light valve, and output light from the reflection type light valve also is refracted by the condenser lens to be incident upon the projection lens system. Furthermore, the lens is disposed with its optical axis deflected from that of the projection lens system.

Therefore, the incident angle of incident light to the reflection type light valve and the output angle of output light from the reflection type light valve are changed in accordance with the position of the display region of the reflection type light valve, and the changes in the incident angle and the output angle become non-symmetrical with respect to the optical axis of the reflection type light valve or that of the projection lens system.

Thus, even in the projection type display apparatus described in JP 11(1999)-249069 A, the overlap of the optical path of the incident light to the reflection type light valve and the optical path of the output light from the reflection type light valve can be reduced. Furthermore, since it is not required to use a prism, an apparatus can be miniaturized.

However, in the projection type display apparatus described in JP 11(1999)-249069 A, the condenser lens is disposed immediately before the display region of the reflection type light valve is deflected, and the condenser lens constitutes a part of the projection lens system. Therefore, it is considered to be difficult to obtain an image in which an aberration balance becomes symmetrical with respect to the optical axis. Furthermore, when it is attempted to correct the aberration balance, it is necessary to increase the number of projection lenses, which makes the projection lens system complicated.

Furthermore, in the projection type display apparatus described in JP 11(1999)-249069 A, in order to obtain a satisfactory resolution, the reflection type light valve is tilted at 2° to 8° with respect to the optical axis of the projection lens system. However, according to the "Shineproof Theorem", it is considered that a projected image of the reflection type light valve also is tilted with respect to the optical axis of the projection lens system. Therefore, in the case where the display region of the reflection type light valve is in a rectangular shape, the projected image on a surface perpendicular to the optical axis has a trapezoidal shape; accordingly, it may be difficult to obtain a satisfactory display image. The Shineproof Theorem refers to a theorem: when an object is tilted with respect to an optical axis, an image is tilted in a reverse direction, and these tilt angles can define each other.

Furthermore, JP 2000-39585 A also discloses a projection type display apparatus having a configuration in which a positive lens is disposed immediately before the display region of the reflection type light valve, in the same way as in JP 11(1999)-249069 A. Even in the projection type display apparatus, illumination light from an illumination optical system passes through a positive lens, so that it illuminates the reflection type light valve after being refracted. Furthermore, output light from the light valve is incident upon a projection lens system after being refracted by a positive lens.

In the projection type display apparatus described in JP 2000-39585 A, a partial region of the effective region of a positive lens is used for allowing illumination light to pass therethrough, and the remaining region is used for allowing reflected light from the reflection type light valve to pass therethrough. Therefore, the optical axis of the positive lens is largely shifted from that of the main group of the projection lens system.

Therefore, even in the projection type display apparatus described in JP 2000-39585 A, the overlap of the optical path of the incident light to the reflection type light valve and that of output light from the reflection type light valve can be reduced, whereby these optical paths can be separated from each other. Furthermore, since it is not required to use a prism, an apparatus can be miniaturized.

However, even in the projection type display apparatus disclosed in JP 2000-39585 A, the reflection type light valve is disposed so that its optical axis forms an angle of 5° to 15° with respect to the optical axis of the main group of the projection lens system. Thus, the optical axis of the projected image and that of the light valve are not parallel to the optical axis of the projection lens system.

Therefore, even in the projection type display apparatus disclosed in JP 2000-39585 A, in the same way as the projection type display apparatus disclosed by JP 11(1999)-249069 A, a projected image is tilted to have a trapezoidal shape in accordance with the "Shineproof Theorem", and it may be difficult to obtain a satisfactory image.

Furthermore, the positive lens disposed immediately before the display region of the reflection type light valve is disposed so that its optical axis forms an angle with respect to the optical axis of the light valve. Furthermore, it is required to dispose a deflection lens in the projection lens system. Therefore, even in the projection type display apparatus disclosed by JP 2000-39585 A, in the same way as the projection type display apparatus disclosed by JP 11(1999)-249069 A, it is considered to be difficult to obtain an image in which an aberration balance becomes symmetrical with respect to the optical axis. Furthermore, when it is attempted to correct the aberration balance, it is required to increase the number of projection lenses, which makes the projection lens system complicated. Furthermore, in this case, when a positive lens is composed of a double-convex lens, the central thickness of the lens is increased. When the positive lens is composed of a meniscus lens, it is difficult to obtain a sufficient power.

In the projection type display apparatus disclosed by JP 2000-39585 A, a part of illumination light incident upon a positive lens is reflected from an interface between the positive lens and the air layer due to the difference in refractive index therebetween. Furthermore, as the positive lens, a double-convex lens or a lens with a convex surface placed on the projection lens system side and a concave surface placed on the reflection type light valve side is used.

Because of this, the reflected light reflected from the interface is reflected in a main group direction of a projection lens system to reach a screen. The reflected light reflected from the interface is stray light generated constantly irrespective of a video signal input to the reflection type light valve. The stray light causes a decrease in contrast in a projected image and generation of a ghost image, which decrease the quality of the projected image remarkably.

In general, a reflection preventing film having practically sufficient performance reflects at least about 0.5% of the incident light, and transmits at most about 99.5%. Therefore, it is considered that if a reflection preventing film at an ordinary level is formed by stacking a $TiO_2$ film, an $SiO_2$ film, and the like on the surface of the positive lens, the reflected light possibly can be decreased. However, there is a limit to the reduction of reflected light only by forming the reflection preventing film composed of such a multilayer film, and hence, there also is a limit to the improvement of the quality of the projected image. Furthermore, it is ideal that a reflection preventing film transmitting 100% incident light may be formed; however, at present, it is practically impossible to form such a reflection preventing film.

The object of the present invention is to provide: a small projection type display apparatus that overcomes the above-mentioned problems and is capable of obtaining a projected image of high quality by suppressing the optical path of incident light to a reflection type light valve from being overlapped with the optical path of output light from the reflection type light valve, and suppressing unnecessary reflected light in a lens interface from being incident upon the projection lens system; and a rear projector and a multi-vision system using the projection type display apparatus.

DISCLOSURE OF INVENTION

In order to achieve the above-mentioned object, a first projection type display apparatus according to the present invention includes: an illumination optical system for collecting light radiated from a light source to form illumination light; a reflection type light valve for reflecting the illumination light to output modulated light forming an optical image; a projection lens system for projecting the optical image formed by the reflection type light valve; and a lens element with a positive power, wherein the lens element is composed of one plano-convex lens, and is placed between the reflection type light valve and the projection lens system with a convex surface directed to the projection lens system, in such a manner that the illumination light passes through the lens element to illuminate the reflection type light valve, and the modulated light output from the reflection type light valve passes through the lens element to be incident upon the projection lens system.

In the above-mentioned first projection type display apparatus according to the present invention, it is preferable that a reflection preventing film is provided on the convex surface of the lens element. Furthermore, it is preferable that the reflection type light valve, the projection lens system, and the lens element with a positive power are placed so that their optical axes are parallel to and matched with each other.

Furthermore, in the above-mentioned first projection type display apparatus according to the present invention, the lens element and the reflection type light valve are placed under a condition that optical axes are parallel to each other, and a distance is provided between the optical axes so that light incident upon the projection lens system from unnecessary light components of the illumination light reflected from an optical interface of the lens element is separated from an effective light component of the modulated light. In this case, if the reflection type light valve has a rectangular display region, it is preferable that the distance is provided in parallel to either side of the rectangle and set to be ¼ or more and ½ or less of a length of the side.

Furthermore, in the above-mentioned first projection type display apparatus according to the present invention, it is preferable that the lens element and the reflection type light valve are placed at a distance in a direction of optical axes thereof so that light incident upon the projection lens system from unnecessary light components of the illumination light reflected from an optical interface of the lens element is separated from an effective light component of the modulated light.

In order to achieve the above-mentioned object, a second projection type display apparatus according to the present invention includes: an illumination optical system for collecting for collecting light radiated from a light source to form illumination light; a reflection type light valve for reflecting the illumination light to output modulated light forming an optical image; a projection lens system for projecting the optical image formed by the reflection type light valve; and a lens element with a positive power, wherein the lens element has a plurality of projections on one optical interface or both optical interfaces and is placed between the reflection type light valve and the projection lens system so that the illumination light passes through the lens element to illuminate the reflection type light valve, and modulated light output from the reflection type light valve passes through the lens element to be incident upon the projection lens system, and the plurality of projections are formed so that a pitch is ½ or less of a visible band wavelength and a height is one time or more of the pitch.

In the above-mentioned second projection type display apparatus according to the present invention, it is preferable that the plurality of projections have an axial cross-section that is increased in size gradually from a tip end portion to a bottom portion. Furthermore, it is preferable that the reflection type light valve, the projection lens system, and the lens element with a positive power are placed so that their optical axes are parallel to and matched with each other.

In order to achieve the above-mentioned object, a third projection type display apparatus includes: an illumination optical system for collecting for collecting light radiated from a light source to form illumination light; a reflection type light valve for reflecting the illumination light to output modulated light forming an optical image; a projection lens system for projecting the optical image formed by the reflection type light valve; and a lens element with a positive power, wherein the reflection type light valve and the projection lens system are placed so that their optical axes are parallel to each other, the lens element is configured by cementing a plano-concave lens with a plano-convex lens with a refractive index larger than that of the plano-concave lens and is placed between the reflection type light valve and the projection lens system so that the illumination light passes through the lens element to illuminate the reflection type light valve, and modulated light output from the reflection type light valve passes through the lens element to be incident upon the projection lens system, and the plano-concave lens and the plano-convex lens are cemented with each other via a film having a refractive index larger than that of the plano-concave lens and smaller than that of the plano-convex lens, or a film whose refractive index is varied from that of the plano-concave lens to that of the plano-convex lens.

In the above-mentioned first to third projection type display apparatus, it is preferable that the projection lens system and the lens element are placed so that their optical axes are matched with each other, the projection lens system has a diaphragm deflected with respect to the optical axis thereof, and the illumination optical system is placed so that the modulated light passes through the diaphragm. In this case, it is preferable that the diaphragm is deflected in a direction away from an optical axis of the illumination optical system, and the projection lens system has means for adjusting a focal point only by movement in a direction of the optical axis thereof. Furthermore, in this case, it is preferable that the following Equation (1) is satisfied:

$$F1 = 1/(2 \sin(\theta1 + \alpha)) \quad (1)$$

where F1 is an F-number of the projection lens system, θ1 is a spread angle of light that is output from the illumination optical system and reflected from the reflection type light valve to be incident upon the projection lens system, and α is an angle formed by a principal ray output from a center of a display region of the reflection type light valve and an optical axis of the projection lens system.

Furthermore, in the above-mentioned first to third projection type display apparatuses according to the present invention, it is preferable that the illumination optical system has an output pupil formed of a plurality of partial pupil elements and is configured so that a luminous flux distribution of the illumination light becomes uniform when reflected from the reflection type light valve.

Furthermore, in the above-mentioned first to third projection type display apparatuses according to the present invention, it is preferable that an output pupil of the illumination optical system and an entrance pupil of the projection lens system have a substantially conjugate relationship with respect to the lens element, and 80% or more of a luminous flux reflected from a display region of the reflection type light valve among luminous fluxes passing through the output pupil of the illumination optical system passes through the lens element to be incident upon an effective region of the entrance pupil of the projection lens system.

In order to achieve the above-mentioned object, a rear projector according to the present invention includes any of the above-mentioned first to third projection type display apparatuses according to the present invention, a mirror for reflecting light projected from the projection type display apparatus, and a screen for transmitting and scattering light reflected from the mirror to display it.

In order to achieve the above-mentioned object, a multi-vision system according to the present invention includes a plurality of projection systems and a video signal dividing circuit, wherein each of the plurality of projection systems is composed of any of the first to third projection type display apparatuses according to the present invention, a transmission type screen for displaying light projected from the projection type display apparatus, and a housing for accommodating the projection type display apparatus, and the video signal dividing circuit divides a screen into a plurality of regions, processes a video signal in each of the regions, and supplies the video signal to the projection system.

BEST MODE FOR CARRYING OUT THE INVENTION

EMBODIMENT 1

Figure 1:
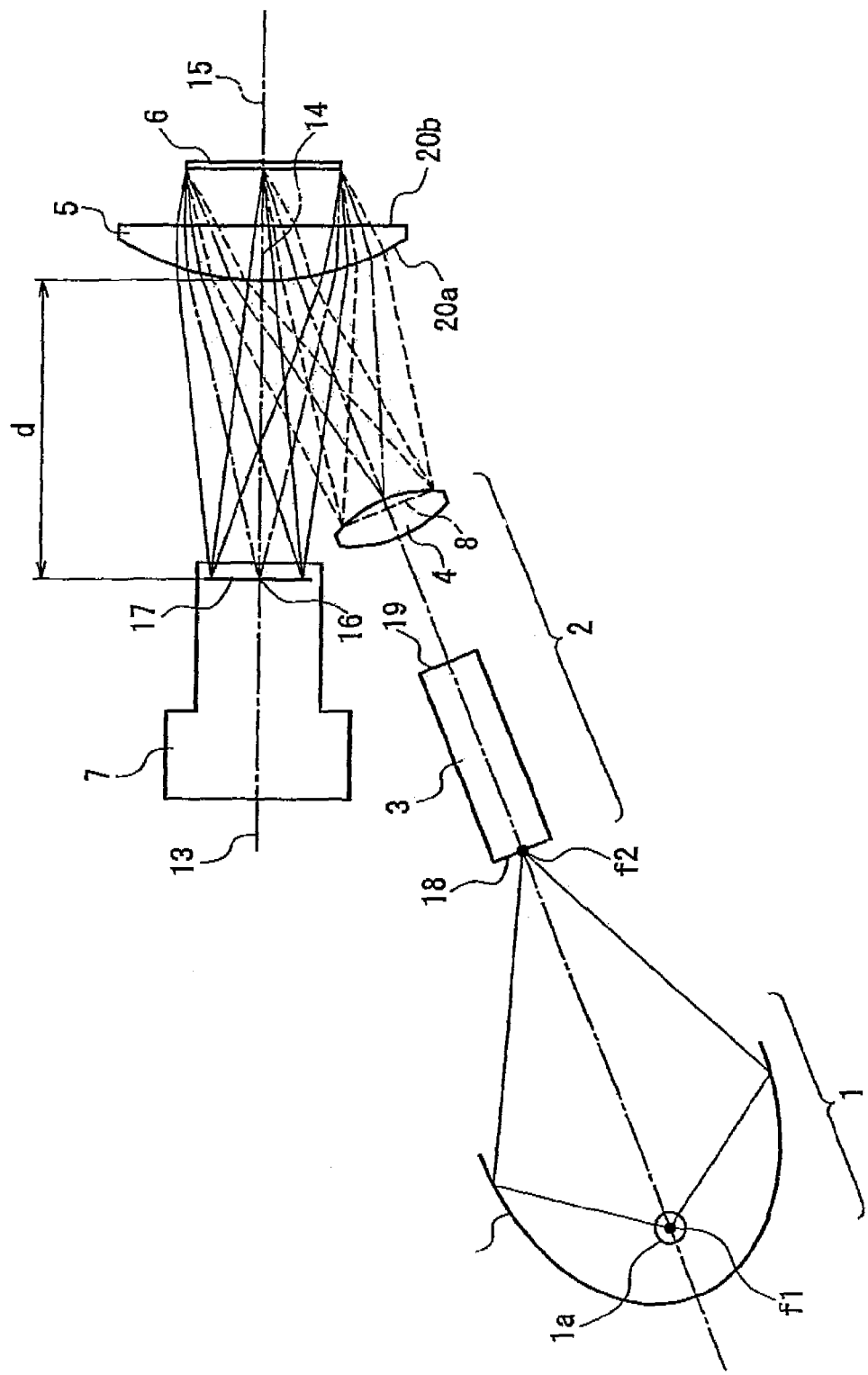
FIG. 1 is a view showing a configuration of a projection type display apparatus according to Embodiment 1 of the present invention.
Figure 2A:
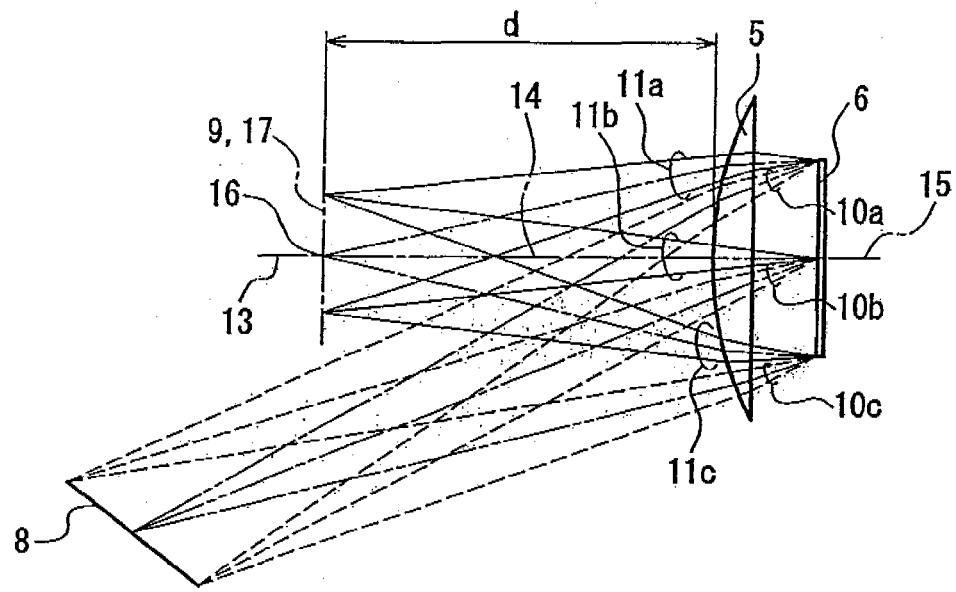
FIG. 2A is a view showing optical paths of illumination light and projected light in a portion in the vicinity of a reflection type light valve shown in FIG. 1.
Figure 2B:
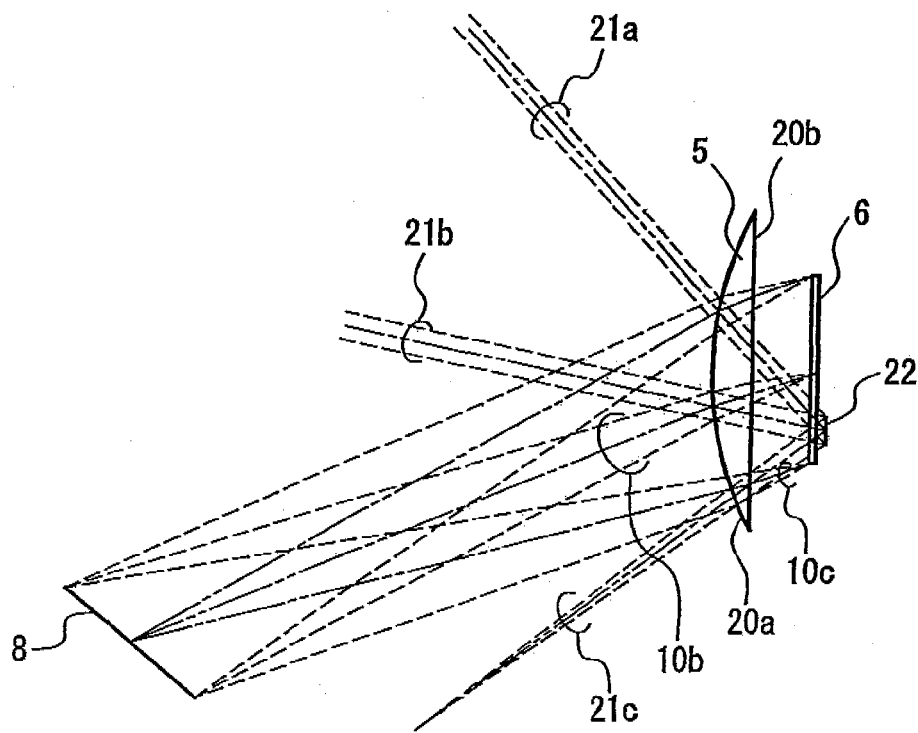
FIG. 2B is a view showing the behavior of reflected light on an optical interface of a lens element with a positive power in the portion in the vicinity of the reflection type light valve shown in FIG. 1.

Hereinafter, a projection type display apparatus according to Embodiment 1 of the present invention will be described with reference to FIGS. 1 and 2. FIG. 1 is a view showing a configuration of the projection type display apparatus according to Embodiment 1 of the present invention. FIG. 2A is a view showing optical paths of illumination light and projected light in a portion in the vicinity of a reflection type light valve shown in FIG. 1. FIG. 2B is a view showing the behavior of reflected light on an optical interface of a lens element with a positive power in the portion in the vicinity of the reflection type light valve shown in FIG. 1.

Figure 17:
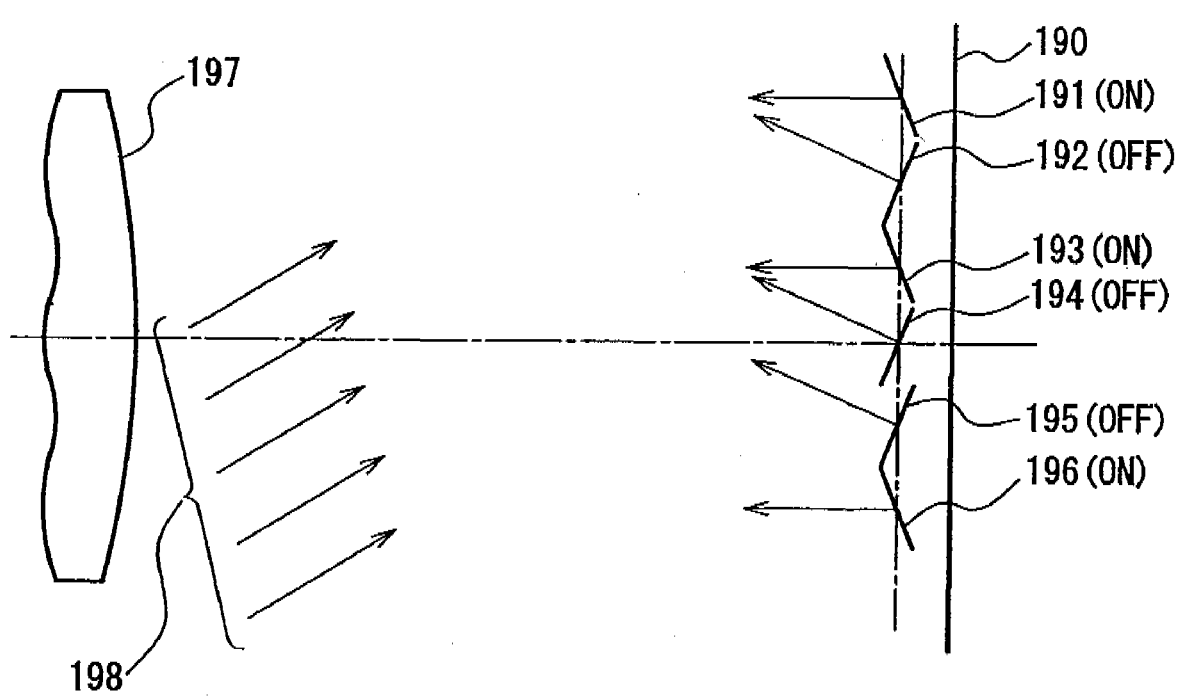
FIG. 17 is a view showing an operation state of micro mirrors constituting the respective pixels of a conventional DMD.

In Embodiment 1, as the reflection type light valve, the DMD shown in FIG. 17 is used. Furthermore, FIGS. 1 and 2 show cross-sections taken along a surface perpendicular to a rotation spindle of micro mirrors constituting the DMD. The movable range of the micro mirrors is ±10°.

First, the configuration and operation of the projection type display apparatus according to Embodiment 1 will be described with reference to FIG. 1. As shown in FIG. 1, the projection type display apparatus according to the present embodiment at least includes a light source 1, an illumination optical system 2 for condensing light radiated from the light source 1 to form illumination light, a reflection type light valve (spatial light modulator) 6 for reflecting the illumination light to output modulated light forming an optical image, a projection optical system 7 for projecting the optical image formed by the reflection type light valve 6, and a lens element 5 with a positive power.

Furthermore, as shown in FIG. 1, the lens element 5 with a positive power is composed of one plano-convex lens, and is placed between the reflection type light valve 6 and the projection lens system 7 with the convex surface directed to the projection lens system 7. Furthermore, the lens element 5 with a positive power is placed in such a manner that illumination light passes through the lens element 5 to illuminate the reflection type light valve 6 and modulated light output from the reflection type light valve 6 passes through the lens element 5 to be incident upon the projection lens system 7.

Figure 18:
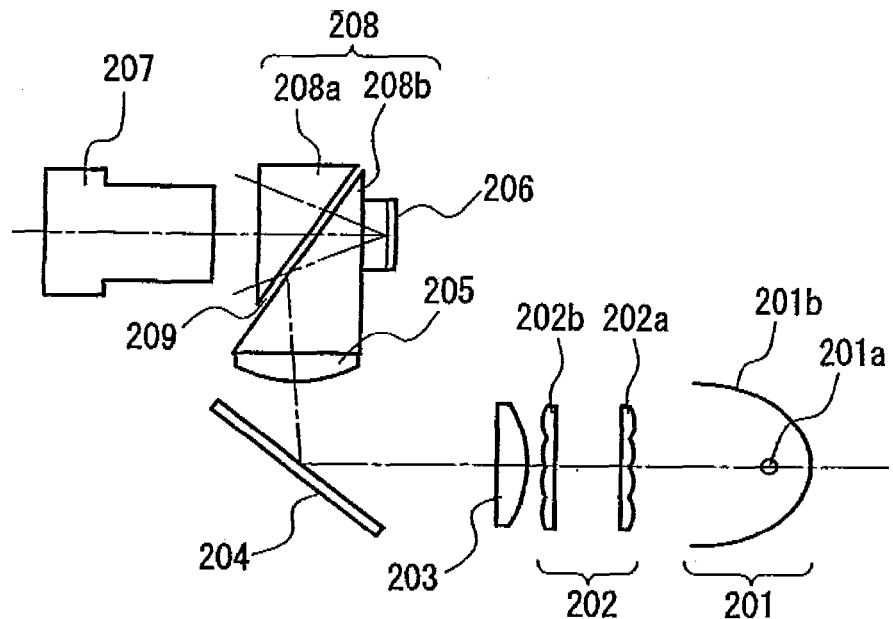
FIG. 18 is a view showing a schematic configuration of a projection type display apparatus using a conventional DMD.
Figure 19:
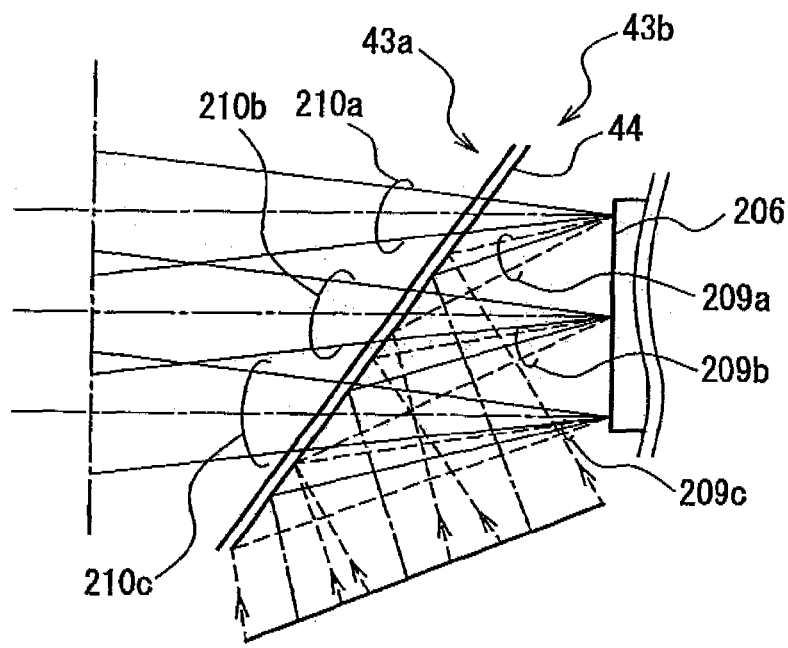
FIG. 19 is a magnified view showing a portion in the vicinity of the DMD shown in FIG. 18.
Figure 20:
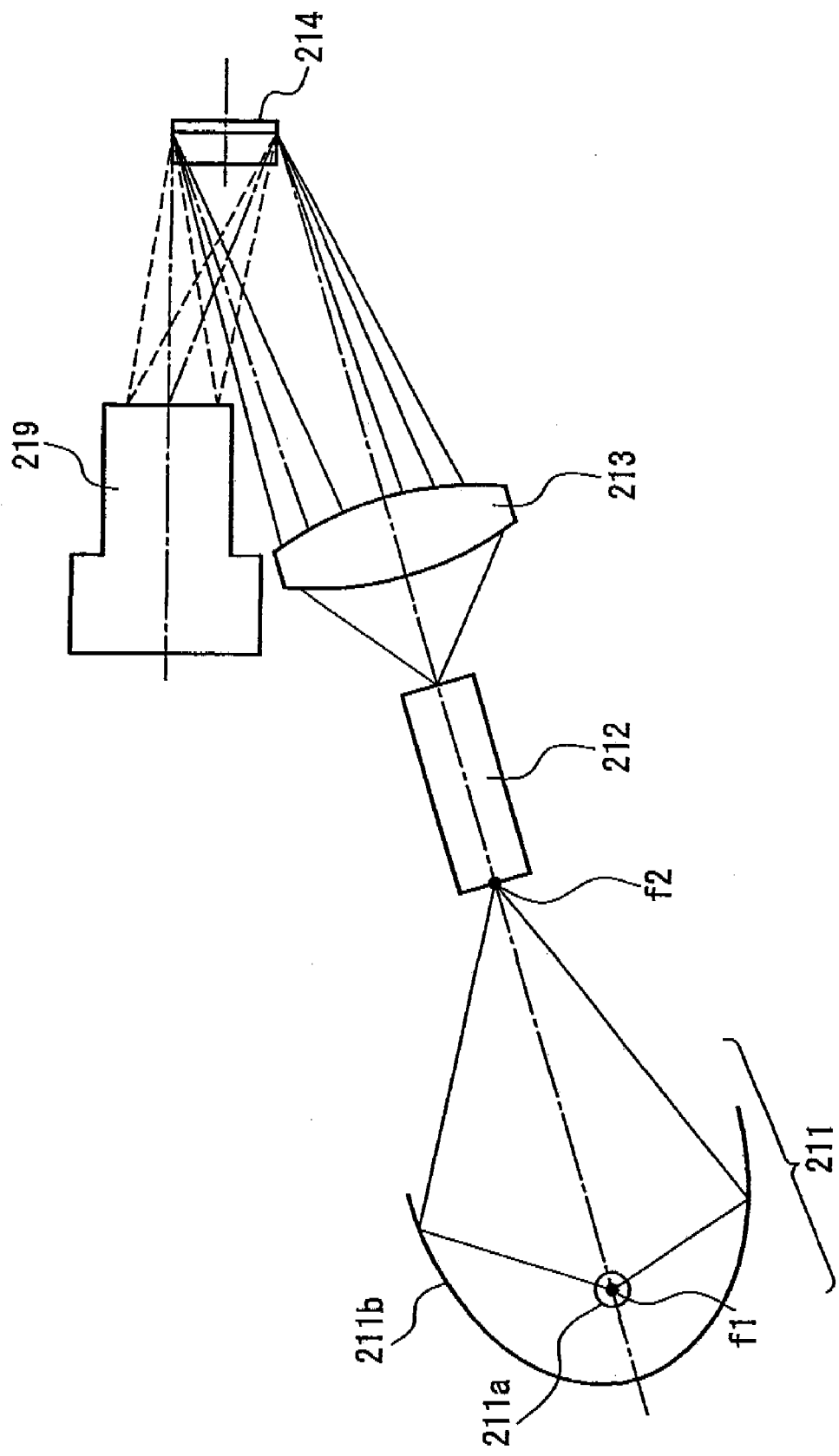
FIG. 20 is a view showing a schematic configuration of a conventional projection type display apparatus in which a projection lens system is designed as a non-telecentric type.
Figure 21:
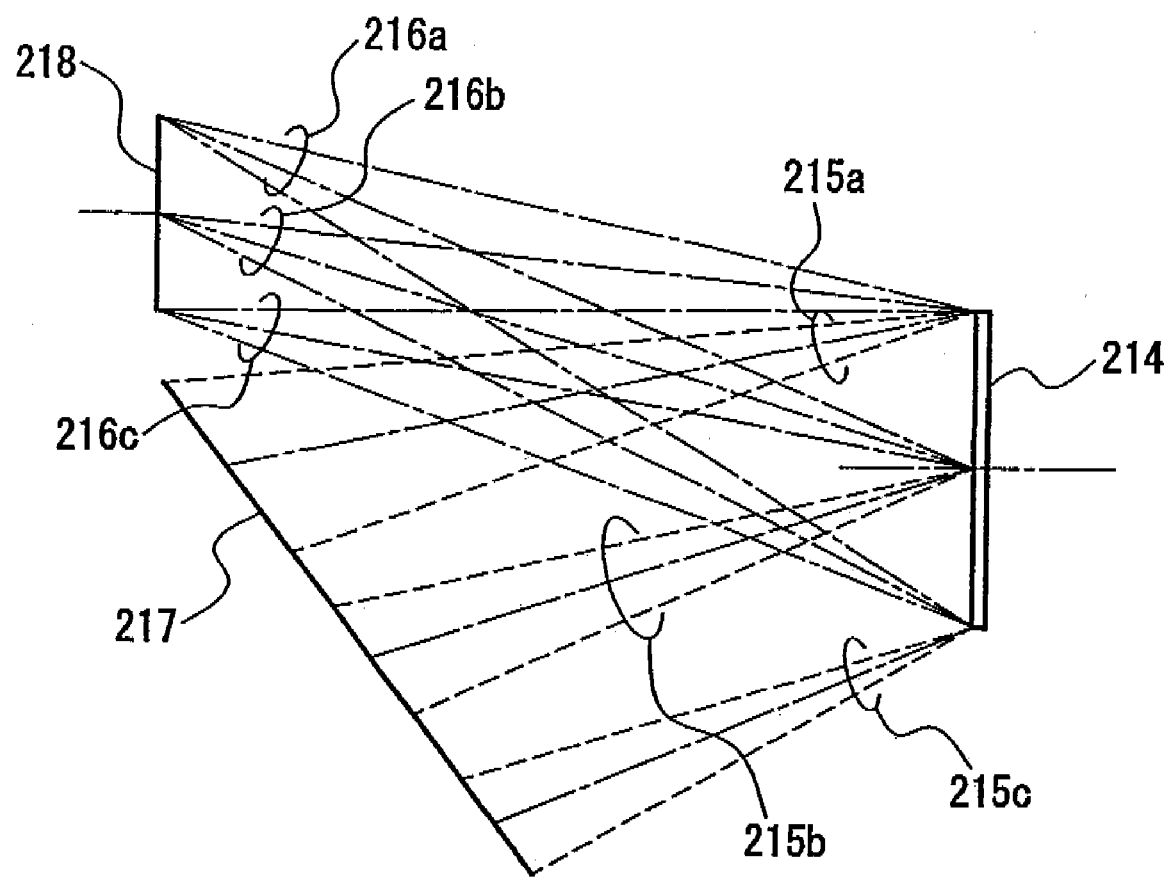
FIG. 21 is a magnified view showing a portion in the vicinity of a reflection type light valve shown in FIG. 20.

In Embodiment 1, the light source 1 is composed of a lamp 1$a$ and a concave mirror 1$b$, which are the same as those of the light source 201 shown in FIG. 18. Thus, light radiated from the lamp 1$a$ is reflected from the concave mirror 1$b$ to form an illuminator image at a second focal point f2 of the concave mirror 1$b$.

The illumination optical system 2 is composed of a rod lens 3 and a relay lens system 4. The second focal point f2 of the concave mirror 1$b$ is substantially matched with a plane of incidence 18 of the rod lens 3. The light incident upon the rod lens 3 repeats multiple reflection on an inner surface of the rod lens 3. Therefore, luminous fluxes having a nonuniform optical amount on the plane of incidence 18 of the rod lens 3 are made uniform on an output plane 19 of the rod lens 3.

Light output from the rod lens 3 is incident upon the relay lens system 4, and output from the relay lens system 4 to the reflection type light valve 6. The light output from the relay lens system 4 passes through the lens element 5 with a positive power, and illuminates the reflection type light valve 6.

Consequently, the output light from the reflection type light valve 6 passes through the lens element 5 with a positive power to be incident upon the projection optical system 7, whereby an optical image on the reflection type light valve 6 is projected on a screen in a magnified state. The output plane 19 of the rod lens 3 and the display region of the reflection type light valve 6 have a conjugate relationship in an optical system in which the relay lens system 4 is combined with the lens element 5 with a positive power.

Next, the principle of the projection type display apparatus of the present invention will be described with reference to FIG. 2. As described with reference to FIG. 1, luminous fluxes condensed by the light source 1 and made uniformed and shaped by the illumination optical system 2 are output from an output pupil 8 of the illumination optical system 2. More specifically, as shown in FIGS. 2A and 2B, a luminous flux 10a illuminating an upper portion of the reflection type light valve 6, a luminous flux 10b illuminating a central portion of the reflection type light valve 6, and a luminous flux 10c illuminating a lower portion of the reflection type light valve 6 are output from the output pupil 8 of the illumination optical system 2.

The "upper portion", "central portion", and "lower portion" as used in the present specification refer to a positional relationship in the figure Furthermore, in FIGS. 2A and 2B, the luminous fluxes 10a to 10c are indicated by only representative light beams such as an upper ray output from the upper end of the output pupil 8, a principal ray output from the center of the output pupil 8, and a lower ray output from the lower end of the output pupil 8.

The luminous fluxes 10a, 10b, and 10c pass through the lens element 5 with a positive power to be incident upon the reflection type light valve 6. Therefore, among the light beams output from the output pupil 8, the luminous flux 10a illuminating the upper portion of the reflection type light valve is refracted by the lens element 5 with a positive power in such a direction that an angle formed between the luminous flux 10a and an optical axis 14 of the lens element 5 with a positive power becomes smaller than that before the luminous flux 10a is incident upon the lens element 5 with a positive power.

On the other hand, the luminous flux 10c illuminating the lower portion of the reflection type light valve 6 is refracted by the lens element 5 with a positive power in such a direction that an angle formed between the luminous flux 10c and the optical axis 14 becomes larger. Therefore, the luminous fluxes 10a, 10b, and 10c passing through the lens element 5 with a positive power become telecentric illumination light in which the respective principal rays are substantially parallel to each other and an angle formed between the luminous fluxes 10a, 10b, and 10c and an optical axis 15 of the reflection type light valve 6 is about 20°. Thus, the display region of the reflection type light valve 6 is illuminated uniformly. Furthermore, a spread angle of each luminous flux also becomes substantially equal.

Furthermore, each micro mirror of the reflection type light valve 6 is designed so as to be tilted at 10° in a counterclockwise direction with respect to a surface perpendicular to the optical axis 14 of the lens element 5 with a positive power, when the micro mirrors are in an ON state. Since the illumination light is telecentric, when the micro mirrors are in an ON state, the principal rays of luminous fluxes 11a, 11b, and 11c of the output light from the reflection type light valve 6 are substantially parallel to the optical axis 15 of the reflection type light valve 6 and become telecentric in any display region of the reflection type light valve 6.

Any of the luminous fluxes 11a, 11b, and 11c of the output light from the reflection type light valve 6 pass through the lens element 5 with a positive power to be incident upon an entrance pupil 9 of the projection optical system 7. The light incident upon the entrance pupil 9 of the projection optical system 7 is projected on a screen by the projection optical system in a magnified state.

Herein, as shown in FIG. 2B, the luminous fluxes 10a, 10b, and 10c pass through the lens element 5 with a positive power to be incident upon the reflection type light valve 6. At this time, the luminous fluxes 10a, 10b, and 10c are partially reflected from an optical interface (convex surface) 20a of the lens element 5 to form luminous fluxes 21a, 21b, and 21c. The reflected light from the optical interface 20a forms a virtual image 22 in the vicinity of the light valve display region to become an unnecessary light component.

Furthermore, it is considered that a part of the unnecessary light component is incident upon the entrance pupil 9 of the projection lens system 7 to reach a screen.

On the other hand, an optical interface 20b of the lens element 5 with a positive power is a flat surface having no power. Therefore, when passing through the optical interface 20b whose optical axis is parallel to the that of the reflection type light valve 6, the luminous fluxes 10a, 10b, and 10c output from the output pupil 8 of the illumination optical system 2 are refracted in accordance with the "Snell's law" based on the refractive index difference between the optical interface 20b and the air layer.

In this case, light is reflected from the optical interface 20b in the same way as the optical interface 20a. However, the optical interface 20b is flat, so that the reflected light thereof is output at the same angle as an incident angle of incident light based on the normal to the interface. Furthermore, the luminous fluxes 10a, 10b, and 10c output from the output pupil 8 of the illumination optical system 2 become substantially telecentric on the optical interface 20b. Therefore, the luminous fluxes reflected from the optical interface 20b also become substantially telecentric.

Therefore, the spread angle of each luminous flux of the reflected light is equal to each other, and all the angles formed by the principal rays of the respective luminous fluxes of the reflected light with the normal to the interface are the same. The principal rays become substantially parallel to each other. As a result, the virtual image of reflected light from the optical interface 20b is formed at a position far away from the light valve. Therefore, even if a part of the reflected light from the optical interface 20b is incident upon the projection lens system 7, a virtual image is not displayed on a screen due to the concentration of luminous fluxes, and a ghost image is not formed.

The following embodiments are considered: the convex surface (optical interface 20a) of the lens element 5 with a positive power is directed to the reflection type light valve 6 side and a double-convex lens is used as the lens element with a positive power as in a conventional projection type display apparatus. However, in such an embodiment, the luminous fluxes 10a, 10b, and 10c of illumination light incident upon the reflection type light valve 6 become telecentric after passing through the lens element with a positive power.

More specifically, in the above-mentioned embodiment, the principal rays of the luminous fluxes 10a, 10b, and 10c of the illumination light do not become substantially parallel to each other even on any optical interface of the lens element 5 with a positive power, and the reflected light from these optical interfaces form a virtual image in the vicinity of the reflection type light valve. Therefore, in the abovementioned embodiment, compared with Embodiment 1, the amount of an unnecessary light component incident upon the projection lens system 7 is large; consequently, a ghost image and the like are generated on a projected image, resulting in a projected image of a substantially degraded quality.

Thus, in the projection type display apparatus according to Embodiment 1, one plano-convex lens is used as the lens element 5 with a positive power, and the lens element 5 with a positive power is placed between the reflection type light valve 6 and the projection lens system 7 with its convex surface (optical interface 20a) directed to the projection lens system 7. Therefore, when the projection type display apparatus according to Embodiment 1 is used, the degradation of the quality of a projected image due to an unnecessary light component incident upon the projection lens system 7 can be suppressed, compared with a conventional projection type display apparatus.

Furthermore, since the lens element 5 with a positive power is placed as described above, a refraction force acts on the respective luminous fluxes 10a, 10b, and 10c incident from a direction tilted with respect to the optical axis 14 of the lens element 5 with a positive power, in a relatively well-balanced manner. Thus, luminous fluxes are not concentrated in a part of the display region of the reflection type light valve 6, whereby irregular brightness can be suppressed.

In the projection type display apparatus according to Embodiment 1, it is preferable that the optical interface (convex surface) 20a of the lens element 5 with a positive power is coated with an ultra-low reflection coat or the like to form a reflection preventing film. According to this embodiment, reflected light from the optical interface 20a can be suppressed more, and an unnecessary light component reaching a screen can be reduced. Therefore, a satisfactory image, in which a decrease in contrast is suppressed more, can be obtained. Examples of the reflection preventing film include a transparent optical thin film made of $TiO_2$, $SiO_2$, etc., a layered film thereof, and the like.

Furthermore, in the projection type display apparatus according to Embodiment 1, since the lens element 5 with a positive power is used, even if a telecentric optical system is used as the projection lens system 7, the entrance pupil 9 of the projection optical system 7 and the output pupil 8 of the illumination optical system 2 can be made small. Furthermore, the optical path of incident light from the illumination optical system 2 and the optical path of output light from the reflection type light valve can be separated from each other without using a prism. Therefore, in the projection type display apparatus according to Embodiment 1, the apparatus can be miniaturized, and front projection can be realized.

Furthermore, as shown in FIGS. 1 and 2A, in the projection type display apparatus according to Embodiment 1, the optical axis 15 of the reflection type light valve 6, an optical axis 13 of the projection optical system 7, and the optical axis 14 of the lens element 5 with a positive power are parallel to and matched with each other. Therefore, there is no element deflected in the projection optical system, and an aberration of a projected image can be corrected satisfactorily.

The phrase "optical axes are parallel to each other" as used herein also includes the case having an error in a permissible range. Similarly, the phrase "optical axes are matched with each other" includes the case having an error in a permissible range, as well as the case where they are matched with each other perfectly.

Furthermore, the optical axes 13 to 15 are parallel to and matched with each other, so that the principal rays of the luminous fluxes 11a, 11b, and 11c of the output light from the reflection type light valve 6 pass through a focal point 16 of the lens element 5 with a positive power. Furthermore, as shown in FIGS. 1 and 2A, the output pupil 8 of the illumination optical system 2 and the entrance pupil 9 of the projection lens system 7 have a conjugate relationship with respect to the lens element 5 with a positive power, and a focal plane 17 of the lens element 5 with a positive power is matched with the entrance pupil 9 of the projection lens system 7.

Therefore, in the projection type display apparatus according to the present embodiment, peripheral light can be prevented from being eclipsed by the projection lens system 7 without being able to pass therethrough, and a projected image can obtain the maximum brightness. Furthermore, a distance "d" from the apex of the optical interface 20a (convex surface) of the lens element 5 with a positive power to the entrance pupil 9 of the projection lens system 7 is substantially matched with a back focus of the lens element 5 with a positive power.

The output pupil 8 of the illumination optical system 2 and the entrance pupil 9 of the projection optical system 7 have a conjugate relationship with respect to the lens element 5 with a positive power. The term "conjugate relationship" as used herein does not refer to only the case where the entrance pupil 9 of the projection lens system 7 is matched with the focal plane 16 of the lens element 5 with a positive power, as shown in FIGS. 1 and 2. The "conjugate relationship" also refers to the case where the entrance pupil 9 forms an image at a position of the output pupil 8 of the illumination optical system 2 by an image forming system composed of the lens element 5 with a positive power and the reflection type light valve 6. More specifically, as long as at least 80% of the luminous fluxes reflected from the reflection type light valve 6 among the luminous fluxes passing through the output pupil 8 of the illumination optical system 2 passes through the lens element 5 to be incident upon the effective region of the entrance pupil 9 of the projection lens system 7, it can be said that there is the above-mentioned "conjugate relationship".

As shown in FIGS. 1 and 2A, in Embodiment 1, the illumination optical system 2 is placed so that the output pupil 8 is in the vicinity of the focal plane 17 of the lens element 5 with a positive power. By placing the illumination optical system 2 in this manner, the illumination light incident upon the reflection type light valve 6 can be made telecentric easily, and a loss of the illumination light can be suppressed.

In the present embodiment, it is preferable to use the lens element 5 with a positive power having a focal length of about 40 mm to 80 mm for the following reason. If such a lens element 5 with a positive power is used, an appropriate power is obtained, and the luminous fluxes from the output pupil 8 of the illumination optical system 2 can be exactly separated from the luminous fluxes incident upon the entrance pupil 9 of the projection optical system 7 output from the reflection type light valve 6. The focal length of the lens element 5 with a positive power can be selected appropriately in accordance with the angle formed by the incident light to the reflection type light valve 6 and the output light from the reflection type light valve 6, the F-number of the incident light to the reflection type light valve 6, and the F-number of the output light from the reflection type light valve 6.

When the reflection type light valve 6 is in an ON state, the light (ON light) reflected from the reflection type light valve 6 is incident upon the projection lens system 7. On the other hand, when the reflection type light valve 6 is in an OFF state, the reflected light (OFF light) is output in a direction at −40° (clockwise direction) with respect to the optical axis 15. The OFF light is similarly incident upon the lens element 5 with a positive power. However, the output direction of the OFF light is different from that of the ON light. Therefore, the OFF light is condensed at a position that is close to the focal plane 17 of the lens element 5 with a positive power but different from that of the entrance pupil 9 of the projection lens system 7. Therefore, with a configuration in which a diaphragm is provided in the vicinity of a final plane of the projection lens system 7, the incidence of unnecessary light can be minimized.

In Embodiment 1, it is preferable that the lens element 5 with a positive power is made of a vitreous material having a high refractive index. In this case, the thickness of the center of the lens element 5 with a positive power can be made thin, and a projection type display apparatus can be miniaturized further. Furthermore, even if the radius of curvature of the convex surface of the lens element is increased, incident light can be refracted with a strong power. Therefore, an unnecessary light component due to reflected light can be suppressed from reaching a screen.

More specifically, it is preferable to use a material having a refractive index of 1.74 to 1.85. With such a material, sufficient performance can be obtained while the cost of a vitreous material is reduced.

EMBODIMENT 2

Figure 3:
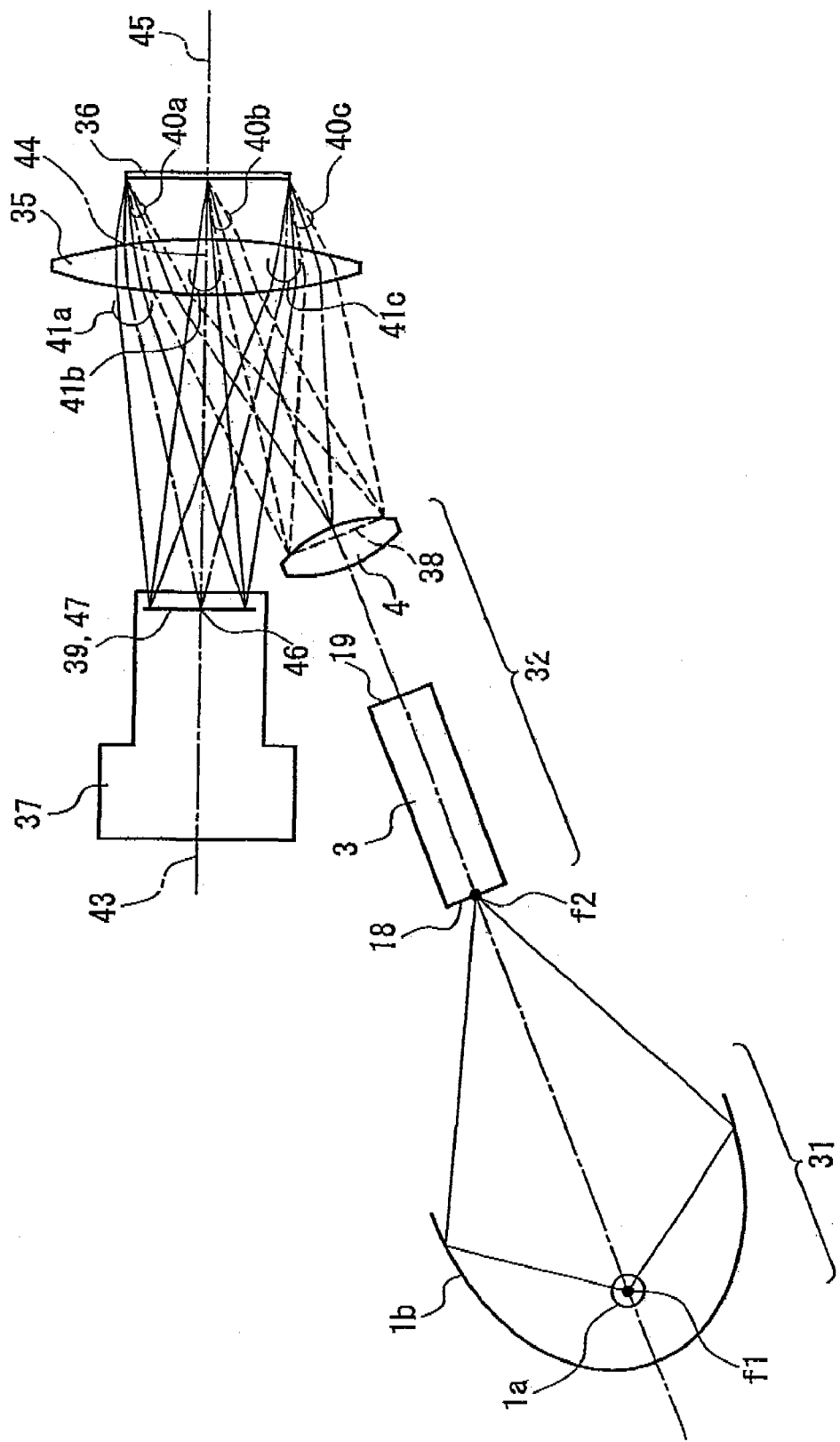
FIG. 3 is a view showing a configuration of a projection type display apparatus according to Embodiment 2 of the present invention.
Figure 4:
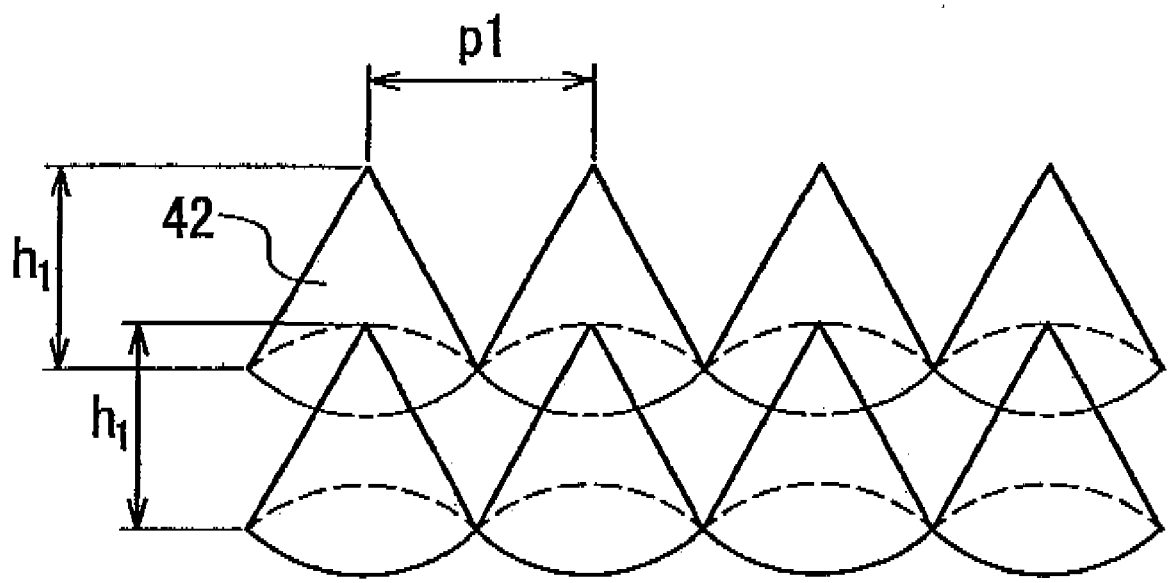
FIG. 4 is a view showing the surface of a lens element with a positive power shown in FIG. 3 in a magnified state.

Next, a projection type display apparatus according to Embodiment 2 of the present invention will be described with reference to FIGS. 3 and 4. FIG. 3 is a view showing a configuration of the projection type display apparatus according to Embodiment 2 of the present invention. FIG. 4 is a magnified view showing a surface of a lens element with a positive power shown in FIG. 3. In Embodiment 2, the DMD shown in FIG. 17 also is used as the reflection type light valve. FIG. 3 shows a cross-section taken along a surface perpendicular to a rotation spindle of micro mirrors constituting the DMD.

As shown in FIG. 3, the projection type display apparatus according to Embodiment 2 is configured in the same way as the projection type display apparatus according to Embodiment 1, except that a lens element 35 with a positive power is different from that in Embodiment 1. More specifically, a light source 31, an illumination optical system 32, a reflection type light valve 36, and a projection lens system 37 are the same as those used in Embodiment 1.

Furthermore, in Embodiment 2, the light source 31, the illumination optical system 32, the lens element 35 with a positive power, the reflection type light valve 36, and the projection lens system 37 are placed in the same way as in Embodiment 1. In Embodiment 2, the reflection type light valve 36, the projection lens system 37, and the lens element 35 with a positive power are placed so that optical axes (45, 43, 44) thereof are parallel to and matched with each other. In FIG. 3, reference numeral 38 denotes an output pupil of the illumination optical system 32, 39 denotes an entrance pupil of the projection lens system 37, 47 denotes a focal plane of the lens element 35 with a positive power, and 46 denotes a focal point of the lens element 35 with a positive power Furthermore, reference numerals 40a to 40c denote luminous fluxes of illumination light, and 41a to 41c denote luminous fluxes of output light from the reflection type light valve 36.

As shown in FIG. 3, in Embodiment 2, the lens element 35 with a positive power is composed of a double-convex lens, unlike Embodiment 1. Furthermore, as shown in FIG. 4, a plurality of minute projections 42 are formed on both surfaces of the lens element 35 with a positive power by a micromachining technique.

A pitch p1 of the projections 42 may be set to be ½ or less of a visible band wavelength (wavelength of illumination light), preferably 150 nm to 250 nm. Furthermore, a height h1 of the projections 42 may be set to be one time or more of the pitch p1, preferably three times or more thereof, and specifically 300 nm to 750 nm.

In the example shown in FIG. 4, the projections 42 are formed in a cone shape, and the area of an axial cross-section is increased in size gradually from a tip end portion to a bottom portion. However, the present invention is not limited thereto. The projections 42 may be formed in a column shape, and the cross-section of the projections 42 may be in a polygonal shape other than a circle.

Therefore, in Embodiment 2, a lens surface with a plurality of minute projections 42 formed thereon comes into contact with an air layer, and light incident upon the lens element 35 with a positive power behaves as if a refractive index is changed continuously by a plurality of minute projections 42, as described in the reference document shown below. In this case, the light incident upon the lens element with a positive power is incident upon the lens element without being reflected from the lens surface as shown in FIG. 2B. Thus, in the projection type display apparatus according to Embodiment 2, an unnecessary light component incident upon the projection lens system 37 can be made zero.

[Reference Document]

Hitoshi TOYOTA, Koji TAKAHARA, Masato OKANO, Tsutom YOTSUYA and Hisao KIKUTA "Fabrication of Microcone Array for Antireflection Structured Surface Using Metal Dotted Pattern", Jpn. J. Appl. Phys. Vol. 40 (2001) pp. L747-L749

As a result, the luminous fluxes 40a, 40b, and 40c from the illumination optical system 32 reach the reflection type light valve 36 without being reflected from each optical interface of the lens element 35 with a positive power to illuminate an optical image. Furthermore, the light output from the reflection type light valve 36 is converged by the lens element 35 with a positive power to be incident upon the entrance pupil 39 of the projection lens system 37. Accordingly, the optical image formed on the reflection type light valve 36 is projected on a screen by the projection lens system 37 in a magnified state.

In Embodiment 2, a plano-convex lens can be used as the lens element 35 with a positive power, in the same way as in Embodiment 1, and the convex surface can be placed so as to be directed to the projection lens system 37. In this case, only the convex surface may be provided with a plurality of minute projections. Furthermore, examples of a method for forming a plurality of minute projections include a method for forming a plurality of minute projections together with the entire lens, using a mold with a plurality of minute concave portions on a molding surface, and a method for forming a plurality of minute projections by etching a lens surface of a lens without a plurality of minute projections.

As described above, if the projection type display apparatus according to Embodiment 2 is used, the degradation of the quality of a projected image due to an unnecessary light component can be further suppressed, compared with the projection type display apparatus according to Embodiment 1. Furthermore, in Embodiment 2, front projection can be realized without using a total reflection prism, in the same way as in Embodiment 1.

Furthermore, in Embodiment 2, the lens element 35 with a positive power preferably is made of a vitreous material with a high refractive index, in the same way as in Embodiment 1. Specifically, it is preferable to use a material with a refractive index of 1.74 to 1.85.

EMBODIMENT 3

Figure 5:
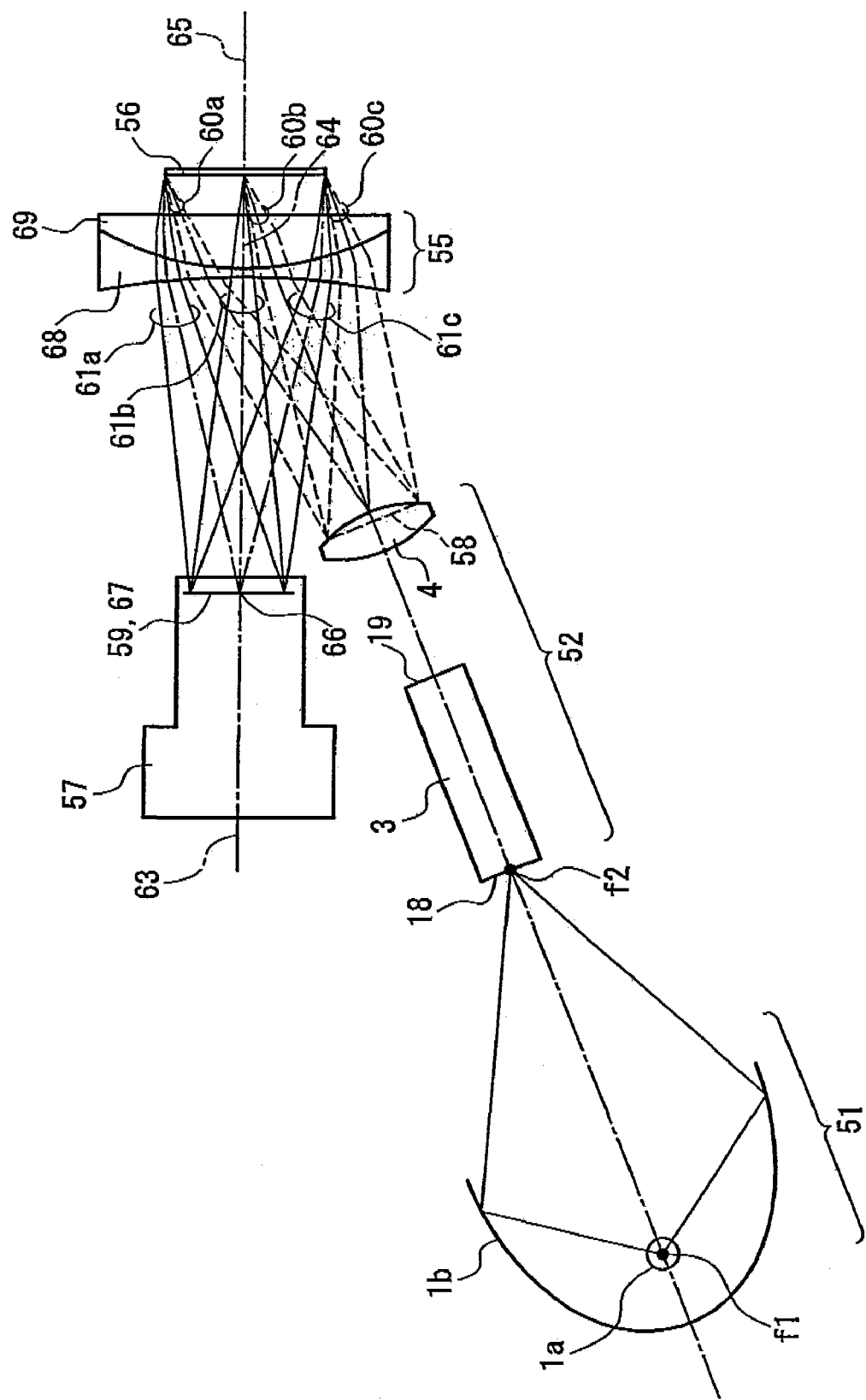
FIG. 5 is a view showing a configuration of a projection type display apparatus according to Embodiment 3 of the present invention.

Next, a projection type display apparatus according to Embodiment 3 of the present invention will be described with reference to FIGS. 5 and 6. FIG. 5 is a view showing a configuration of the projection type display apparatus according to Embodiment 3 of the present invention. FIG. 6 is a magnified cross-sectional view showing a lens element with a positive power shown in FIG. 5. In Embodiment 3, the DMD shown in FIG. 17 also is used as the reflection type light valve. FIG. 5 shows a cross-section taken along a surface perpendicular to a rotation spindle of micro mirrors constituting the DMD.

As shown in FIG. 5, the projection type display apparatus according to Embodiment 3 also is configured in the same way as the projection type display apparatus according to Embodiment 1, except that a lens element 55 with a positive power is different from that in Embodiment 1. More specifically, a light source 51, an illumination optical system 52, a reflection type light valve 56, and a projection lens system 57 are the same as those used in Embodiment 1.

Furthermore, in Embodiment 3, the light source 51, the illumination optical system 52, the lens element 55 with a positive power, the reflection type light valve 56, and the projection lens system 57 are placed in the same way as in Embodiment 1. In Embodiment 3, the reflection type light valve 56, the projection lens system 57, and the lens element 55 with a positive power are placed so that optical axes (65, 63, 64) thereof are parallel to and matched with each other. In FIG. 5, reference numeral 58 denotes an output pupil of the illumination optical system 52, 67 denotes a focal plane of the lens element 55 with a positive power, and 66 denotes a focal point of the lens element 5 with a positive power. Furthermore, reference numerals 60a to 60c denote luminous fluxes of illumination light, and 61a to 61c denote luminous fluxes of output light from the reflection type light valve 56.

As shown in FIGS. 5 and 6, in Embodiment 3, the lens element 55 with a positive power is configured by cementing a plano-concave lens 68 to a plano-convex lens 69, unlike Embodiment 1. Furthermore, the refractive index of the plano-convex lens 69 is larger than that of the plano-concave lens 68.

More specifically, the plano-concave lens 68 is formed of a material having a relatively low refractive index, such as a vitreous material A and a vitreous material B, as shown in the following Table 1. On the other hand, the plano-convex lens 69 is formed of a vitreous material having a relatively high refractive index, such as a vitreous material C and a vitreous material D, as shown in the following Table 1. In Table 1, "nd" represents a refractive index of the vitreous materials A to D, and "vd" represents the dispersion of the vitreous materials A to D.

TABLE 1

|    | Vitreous material A | Vitreous material B | Vitreous material C | Vitreous material D |
|----|---------------------|---------------------|---------------------|---------------------|
| Nd | 1.51680             | 1.51454             | 1.80801             | 1.87800             |
| vd | 64.20               | 54.70               | 40.60               | 38.07               |

The lens element 55 configured by cementing the plano-concave lens 68 to the plano-convex lens 69 also has a positive power as a whole, in the same way as the lens element used in Embodiment 1. Therefore, in the same way as in Embodiment 1, luminous fluxes 60a, 60b, and 60c output from the output pupil 58 of the illumination light optical system 52 become telecentric illumination light in which the respective principal rays are substantially parallel to each other and the angle with respect to the optical axis 65 of the reflection type light valve 56 is about 20°. Furthermore, the spread angle of each luminous flux is substantially equal to each other.

Furthermore, the output light from the reflection type light valve 56 is incident upon the entrance pupil 59 of the projection lens system 57 while its luminous flux is being decreased by the lens element 55 with a positive power. The light incident upon the entrance pupil 59 of the projection lens system 57 is projected on a screen by the projection lens system 57 in a magnified state.

In Embodiment 3, the power of the cemented surface is increased as the difference in refractive index between two lenses to be cemented is larger. However, as the difference in refractive index is larger, the interface reflection on the cemented surface is increased, and unnecessary light caused by the reflection similar to that described in Embodiment 1 is generated on the cemented surface. Therefore, when the amount of an unnecessary light component incident upon the projection lens system 57 is large, the contrast of a projected image is decreased.

Figure 6A:
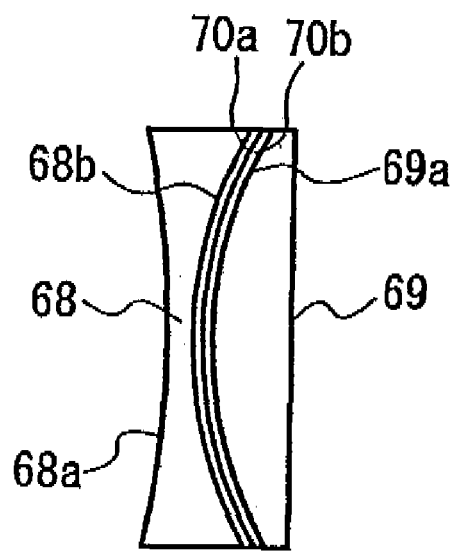
FIGS. 6A and 6B are cross-sectional views showing a lens element with a positive power shown in FIG. 5 in a magnified state.

Therefore, in Embodiment 3, in order to reduce the reflectivity on the cemented surface to suppress the generation of unnecessary light, as shown in FIG. 6A, a film having a refractive index larger than that of the plano-concave lens 68 and smaller than that of the plano-convex lens 69 is interposed between a surface 68b of the plano-concave lens 68 made of a low refractive material and a surface 69a of the plano-convex lens 69 made of a high refractive material.

More specifically, a thin film 70b having a refractive index at least between those of the above-mentioned materials is formed on the surface 69a of the plano-convex lens 69 by vapor deposition or the like, and the plano-convex lens 69 with the thin film 70b formed thereon and the plano-concave lens 68 are cemented to each other with an adhesive 70a having a refractive index between those of the thin film 70b and the plano-concave lens 68. Examples of the thin film 70b shown in FIG. 6A include a $SiO_2$ film, a $TiO_2$ film, etc., and a layered film thereof.

Figure 6B:
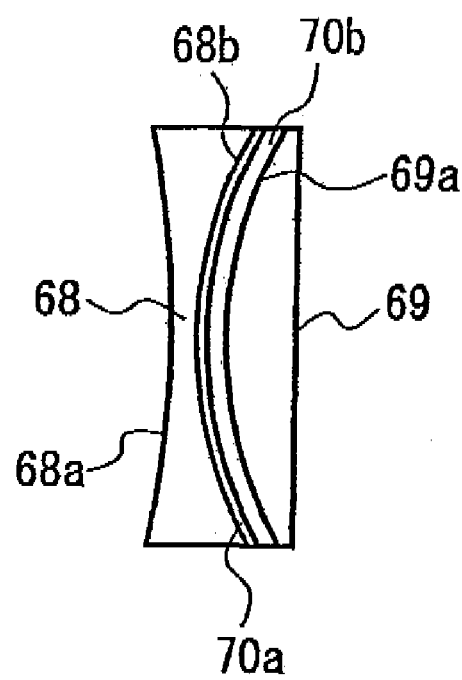

Furthermore, in Embodiment 3, as shown in FIG. 6B, a film having a refractive index that is varied from that of the plano-concave lens 68 to that of the plano-convex lens 69 can be interposed between the surface 68b of the plano-concave lens 68 and the surface 69a of the plano-convex lens 69.

More specifically, a thin film 70b having a refractive index varied continuously from 1.5 to 1.85 is formed on the surface 69a of the plano-convex lens 69 by sputtering, and the plano-convex lens 69 is cemented to the plano-concave lens 68 with an adhesive 70a (e.g., "Araldite AY 103" produced by Chiba Special Chemicals Co., Ltd., etc.) having a refractive index equal to that of the plano-concave lent 68.

An example of the thin film 70b shown in FIG. 6B includes a layered film composed of a film having a high refractive index, a film having an intermediate refractive index, and a film having a low refractive index. Examples of the film having a high refractive index include a $Nb_2O_5$ film, a $Sb_2O_5$ film, a $Ta_2O_5$ film, etc., and a layered film thereof. Examples of the film having an intermediate refractive index include a $SiO_2$ film, a $TiO_2$ film, etc., and a layered film. Furthermore, examples of the film having a low refractive index include a $MgF_2$ film, a LiF film, a $BaF_2$ film, etc., and a layered film.

Because of the embodiment shown in FIGS. 6A and 6B, the interface reflection on the cemented surface between the plano-concave lens 68 and the plano-convex lens 69 can be suppressed to substantially zero. Therefore, a lens element with a positive power can be obtained, in which generation of unnecessary light due to reflected light is suppressed.

In Embodiment 3, the luminous fluxes 60*a*, 60*b*, and 60*c* from the output pupil 58 of the illumination optical system 52 are incident upon the surface 68*a* of the concave lens 68 and are partially reflected from the surface 68*a*. However, the surface 68*a* is a concave surface, and the principal rays of the luminous fluxes 60*a*, 60*b*, and 60*c* are not parallel to each other. Therefore, by appropriately setting the radius of curvature of the surface 68*a*, the reflected light of the luminous fluxes 60*a*, 60*b*, and 60*c* from the surface 68*a* can be suppressed from forming a virtual image on an effective display region of the light valve 56. Furthermore, in order for the luminous fluxes 61*a*, 61*b*, and 61*c* of the output light from the reflection type light valve 56 to be output substantially parallel to each other, the surface 68*a* needs to be a concave surface.

As the radius of curvature of the concave surface (surface 68*a*) of the plano-concave lens 68 is smaller, the reflection angle of various light beams included in the reflected light of the luminous fluxes 60*a*, 60*b*, and 60*c* is increased, and the amount of components of the reflected light incident upon the projection lens system 57 is decreased. However, when the radius of curvature of the surface 68*a* becomes smaller, in order to keep the power of the entire lens element 55 with a positive power, it is required to decrease the radius of curvature of the surfaces 68*b* and 69*a* to be cemented or increase the difference in refractive index between the plano-concave lens 68 and the plano-convex lens 69.

However, the difference in refractive index between the lenses is at most about 0.45 in the case of using an existing transparent vitreous material practically, and it is impossible to increase the difference in refractive index to a value exceeding 0.45. Furthermore, when it is attempted to decrease the radius of curvature of the surfaces 68*b* and 69*a* to be cemented, the thickness of the center needs to be increased in terms of lens processing, which makes a back focus of the projection lens system longer. Thus, for these reasons, as the radius of curvature of the concave surface (surface 68*a*) of the plano-concave lens 68, the maximum radius of curvature should be selected in such a range that a virtual image formed by the reflected light from the surface 68*a* is formed in a region outside of the effective display region of the light valve 56.

Thus, if the cemented lens of the plano-concave lens 68 and the plano-convex lens 69 is used as the lens element 55 with a positive power, an appropriate power for the lens with a positive power can be obtained while the incidence of unnecessary reflected light is suppressed. Furthermore, the luminous fluxes from the output pupil 58 of the illumination optical system 52 can be exactly separated from the luminous fluxes incident upon the entrance pupil 59 of the projection lens system 57 output from the reflection type light valve 56.

Furthermore, in order to enhance the above-mentioned effect, in Embodiment 3, it is preferable to use the lens element 55 with a positive power having a focal length of about 40 mm to 80 mm. The focal length of the lens element 55 with a positive power can be selected appropriately in accordance with the angle formed by the incident light to the reflection type light valve 56 and the output light therefrom, the F-number of the incident light to the reflection type light valve 56, and the F-number of the output light therefrom.

Thus, if the projection type display apparatus according to Embodiment 3 is used, a decrease in the quality of a projected image due to an unnecessary light component can be further suppressed, compared with the projection type display apparatus according to Embodiment 1. Furthermore, in Embodiment 3, front projection can be realized without using a total reflection prism in the same way as in Embodiment 1.

EMBODIMENT 4

Figure 7:
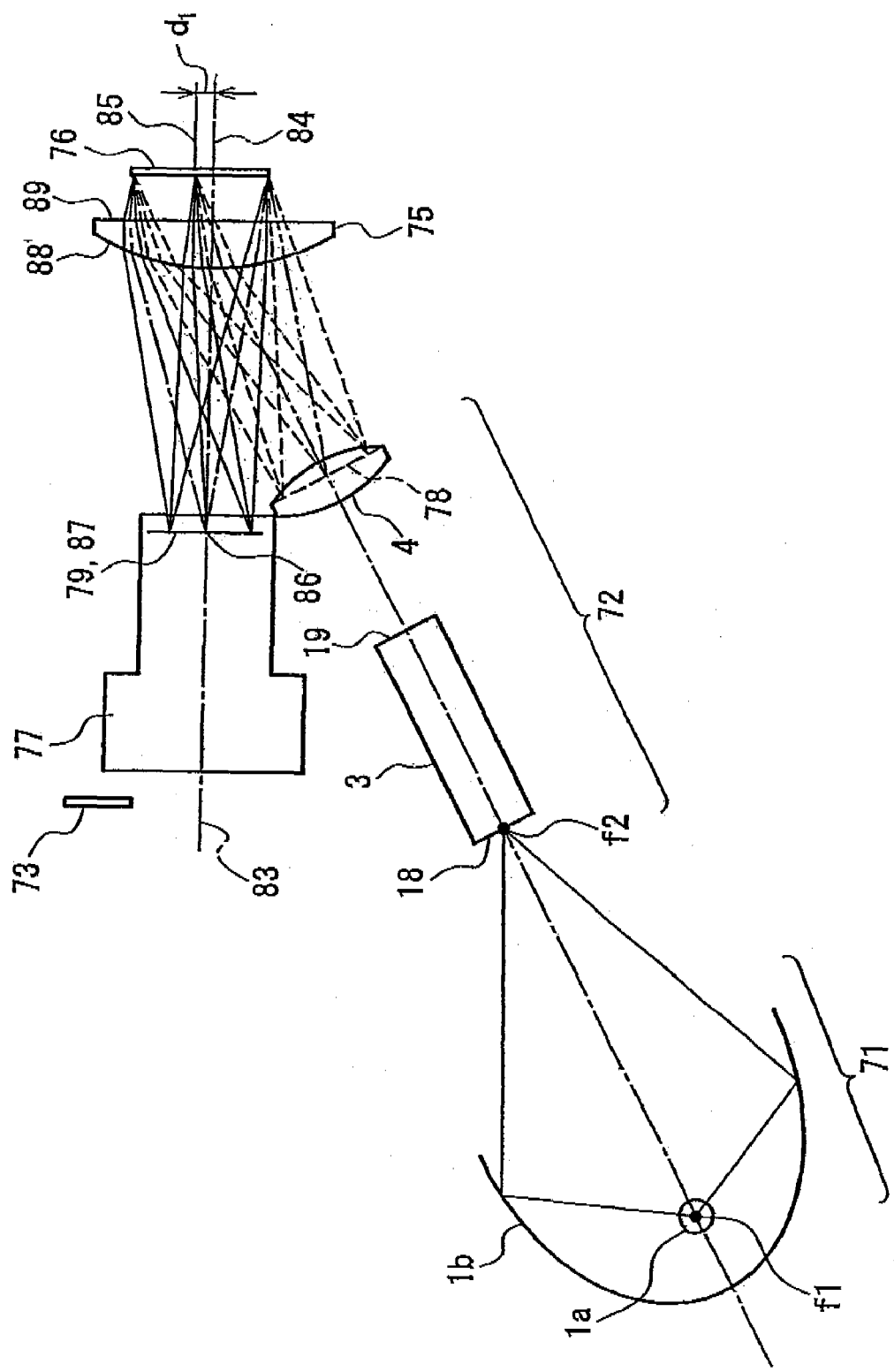
FIG. 7 is a view showing a configuration of a projection type display apparatus according to Embodiment 4 of the present invention.
Figure 8A:
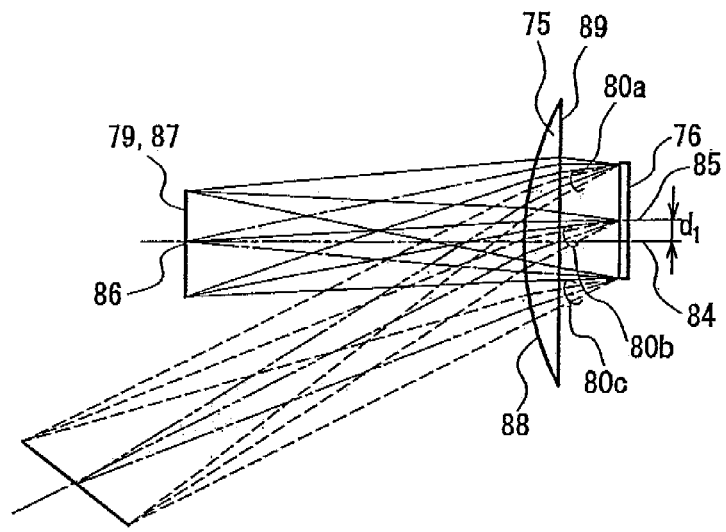
FIG. 8A is a view showing optical paths of illumination light and projected light in a portion in the vicinity of a reflection type light valve shown in FIG. 7.
Figure 8B:
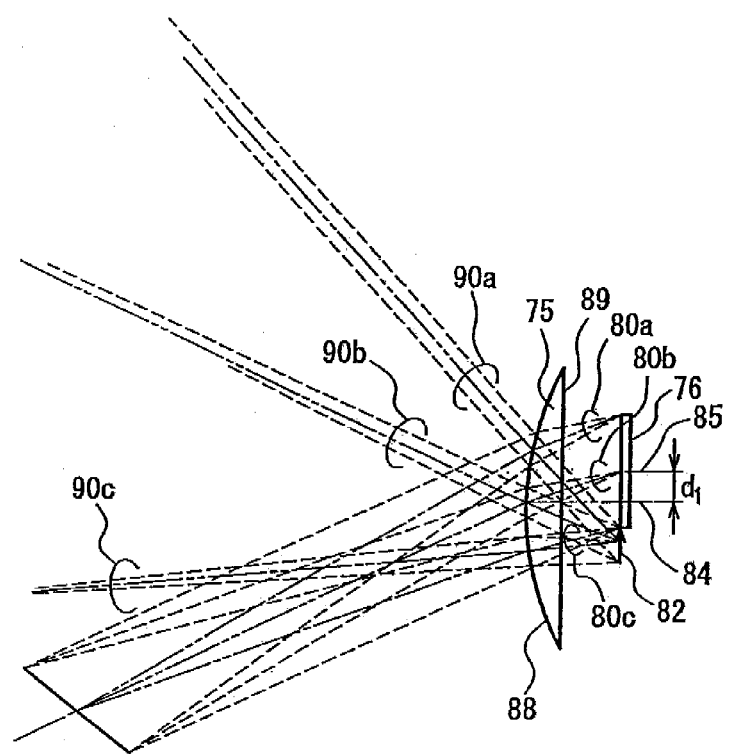
FIG. 8B is a view showing the behavior of reflected light on an optical interface of a lens element with a positive power in the portion in the vicinity of the reflection type light valve.

Next, a projection type display apparatus according to Embodiment 4 of the present invention will be described with reference to FIGS. 7 and 8. FIG. 7 is a view showing a configuration of the projection type display apparatus according to Embodiment 4 of the present invention. FIG. 8A is a view showing optical paths of illumination light and projected light in a portion in the vicinity of a reflection type light valve shown in FIG. 7. FIG. 8B is a view showing the behavior of reflected light on the optical interface of a lens element with a positive power in the portion in the vicinity of the reflection type light valve shown in FIG. 7.

In Embodiment 4, as the reflection type light valve, the DMD shown in FIG. 17 is used, FIGS. 7 and 8 show cross-sections taken along a surface perpendicular to a rotation spindle of micro mirrors constituting the DMD. The movable range of the micro mirrors is ±10°.

First, the configuration and operation of the projection type display apparatus according to Embodiment 4 will be described with reference to FIG. 7. The projection type display apparatus according to Embodiment 4 is different from that according to Embodiment 1 in the following point. As shown in FIG. 7, a reflection type light valve 76 and a lens element 75 with a positive power are placed under the condition that optical axes (85, 84) are parallel to each other, and a distance d1 is provided between the optical axes (85, 84). Furthermore, the distance d1 is set in such a manner that light incident upon the projection lens system from the unnecessary light components of illumination light reflected from an optical interface 88 of the lens element 75 is separated from effective light components of modulated light output from the reflection type light valve.

Furthermore in Embodiment 4, the lens element 75 with a positive power has the same shape as that of the lens element shown in Embodiment 1; however, the lens element 75 is different from that in Embodiment 1 in an effective diameter and a refractive index. Furthermore, a light-shielding portion 73 is placed on a screen side of the projection lens system 77.

The projection type display apparatus according to Embodiment 4 is configured in the same way as the projection type display apparatus according to Embodiment 1, except for the points other than the above-mentioned points. More specifically, the lens element 75 with a positive power is placed in such a manner that illumination light passes through the lens element 75 to illuminate the reflection type light valve 76, and the modulated light output from the reflection type light valve 76 passes through the lens element 75 to be incident upon the projection lens system 77.

Furthermore, the light source 71, the illumination optical system 72, the reflection type light valve 76, and the projection lens system 77 are the same as those used in Embodiment 1. Furthermore, the lens element 75 with a positive power and the projection lens system 77 are placed so that optical axes (84, 83) thereof are parallel to and matched with each other. The output pupil 78 of the illumination optical system 72 and the entrance pupil 79 of the projection lens system 77 have a conjugate relationship with respect to the lens element 75 with a positive power. In FIG. 7, reference numeral 87 denotes a focal plane of the lens element 75 with a positive power, and 86 denotes a focal point of the lens element 75 with a positive power.

With such a configuration, in the projection type display apparatus according to Embodiment 4, in the same way as in Embodiment 1, the output light from the reflection type light valve 76 passes through the lens element 75 with a positive power to be incident upon the projection lens system 77, whereby an optical image on the reflection type light valve 76 is projected on a screen in a magnified state.

Next, the principle of the projection type display apparatus of the present invention will be described with reference to FIG. 8. Luminous fluxes condensed by the light source 71, and made uniform and shaped by the illumination optical system 72 are output from the output pupil 78 of the illumination optical system 72 in the same way as in Embodiment 1. More specifically, as shown in FIG. 8A, a luminous flux 80a illuminating an upper portion of the reflection type light valve 76, a luminous flux 80b illuminating a central portion of the reflection type light valve 76, and a luminous flux 80c illuminating a lower portion of the reflection type light valve 76 are output from the output pupil 78 of the illumination optical system 72.

The luminous fluxes 80a, 80b, and 80c pass through the lens element 75 with a positive power to be incident upon the reflection type light valve 76. Therefore, among the light beams output from the output pupil 78, the luminous flux 80a illuminating the upper portion of the reflection type light valve is refracted by the lens element 75 with a positive power in such a direction that an angle formed between the luminous flux 80a and an optical axis 84 of the lens element 75 with a positive power becomes smaller than that before the luminous flux 80a is incident upon the lens element 75 with a positive power.

On the other hand, the luminous flux 80c illuminating the lower portion of the reflection type light valve 76 is refracted by the lens element 75 with a positive power in such a direction that an angle formed between the luminous flux 80c and the optical axis 84 becomes larger. Therefore, the luminous fluxes 80a, 80b, and 80c passing through the lens element 75 with a positive power become telecentric illumination light in which the respective principal rays are substantially parallel to each other and an angle formed between the luminous fluxes 80a, 80b and 80c, and an optical axis 85 of the reflection type light valve 76 is about 20°. Furthermore, a spread angle of each luminous flux also becomes substantially equal.

At this time, as shown in FIG. 8B, in the same way as in Embodiment 1, the luminous fluxes 80a, 80b, and 80c from the output pupil 78 of the illumination optical system are partially reflected from the optical interface 88 of the lens element 75 with a positive power, and luminous fluxes 90a, 90b, and 90c are generated to travel to the projection lens system 77. These luminous fluxes are unnecessary light forming a virtual image 82 in the vicinity of the reflection type light valve 76.

However, in Embodiment 4, as described above, the reflection type light valve 76 and the lens element 75 with a positive power are placed so that optical axes (85, 84) thereof are away from each other at a distance d1. Furthermore, as described above, the distance d1 is set in such a manner that the light incident upon the projection lens system 77 from the luminous fluxes 90a, 90b, and 90c generated on the optical interface 88 is separated from an effective light component of modulated light output from the reflection type light valve 76.

Therefore, according to Embodiment 4, the virtual image 82 is formed outside the effective display region of the reflection type light valve 76. Thus, unnecessary light can be suppressed from being generated on a display region of a screen, so that a projected image of excellent quality can be obtained.

The distance d1 between the optical axis 85 of the reflection type light valve 76 and the optical axis 84 of the lens element 75 with a positive power is set in view of the size of the effective display region of the reflection type light valve 76, the size and shape of the output pupil 78 of the illumination optical system 72, the strength distribution of the virtual image 82, and the like.

More specifically, the distance d1 can be set as follows. For example, if the reflection type light valve 76 has a rectangular display region, and the distance d1 is provided in parallel to any side of this rectangle, the distance d1 preferably is set to be ¼ or more and ½ or less of the length of the side. In this case, unnecessary light can be suppressed from being generated, while the luminous fluxes from the output pupil 78 of the illumination optical system 72 are separated exactly from the luminous fluxes output from the reflection type light valve 76 and incident upon the entrance pupil 79 of the projection lens system 77, without allowing an effective image circle of the projection lens system 77 to be enlarged remarkably and without allowing the optical axes to be tilted with respect to each other.

Furthermore, in Embodiment 4, as described above, the light-shielding portion 73 is placed on a screen side of the projection lens system 77. Therefore, unnecessary light incident upon the projection lens system 77 can be blocked. The light-shielding portion 73 may be placed at any position between the projection lens system 77 and the screen, as long as unnecessary light can be blocked appropriately.

In the example shown in FIG. 7, unnecessary light is a part of the luminous fluxes output from the projection lens system 77. Therefore, the light-shielding portion 73 has a shape so as to shield only a region through which unnecessary light passes. The shape of the light-shielding portion 73 is not particularly limited. For example, the light-shielding portion 73 may be in a frame shape, an annular shape, or the like having an opening.

In this case, the opening of the light-shielding portion 73 may be provided so that only an effective luminous flux necessary for displaying an original image, from the luminous fluxes output from the reflection type light valve 76 to be incident upon the projection lens system 77, reach a screen (not shown).

Furthermore, in this case, if the light-shielding portion 73 is placed on a screen side of the projection lens system 77, the luminous fluxes herein generally have a shape almost like that of the effective display region of a screen. Therefore, it is preferable that the opening also is formed so as to have a shape almost like that of the effective display region of a screen.

In Embodiment 4, it is preferable that the surface on which the virtual image 82 is formed is substantially matched with the display surface of the reflection type light valve 76. According to this embodiment, a portion of the display region to be overlapped with the virtual image 82 can be minimized, and the distance d1 between the optical axis 84 of the lens element 75 with a positive power and the optical axis 85 of the reflection type light valve 76 can be decreased. Furthermore, according to this embodiment, the effective image circle of the projection lens system 77 can be made smaller.

Furthermore, in Embodiment 4, it is preferable that the lens element 75 with a positive power having a focal length of about 50 mm to 120 mm is used for the following reason. If such a lens element 75 with a positive power is used, an appropriate power is obtained, and the luminous fluxes from the output pupil 78 of the illumination optical system 72 can be separated exactly from the luminous fluxes output from the reflection type light valve 76 to be incident upon the entrance pupil 79 of the projection lens system 77.

The focal length of the lens element 75 with a positive power can be selected appropriately in accordance with the angle formed by the incident light to the reflection type light valve 76 and the output light therefrom, the F-number of the incident light to the reflection type light valve 76, and the F-number of the output light therefrom.

In Embodiment 4, as described above, a lens element with an effective diameter larger than that of the lens element used in Embodiment 1 is used as the lens element 75 for the following reason. The distance d1 is set so that the effective region is enlarged, which is obtained by combining the region where the luminous fluxes of illumination light in the lens element 75 with a positive power pass with the region where the luminous fluxes output from the reflection type light valve 76 pass.

When it is attempted to increase an effective diameter by configuring the lens element 75 with a positive power, using one plano-convex lens, a large central thickness is required for ensuring an edge thickness. Thus, in Embodiment 4, in the same way as in Embodiment 1, it is preferable that the lens element 75 with a positive power is formed of a vitreous material having a high refractive index. More specifically, it is preferable that a material having a refractive index of 1.74 to 1.85 is used.

Thus, if the projection type display apparatus according to Embodiment 4 is used, a decrease in quality of a projected image due to an unnecessary light component can be further suppressed, compared with the projection type display apparatus according to Embodiment 1. In Embodiment 4, in the same way as in Embodiment 1, front projection can be realized without using a total reflection prism.

EMBODIMENT 5

Figure 9:
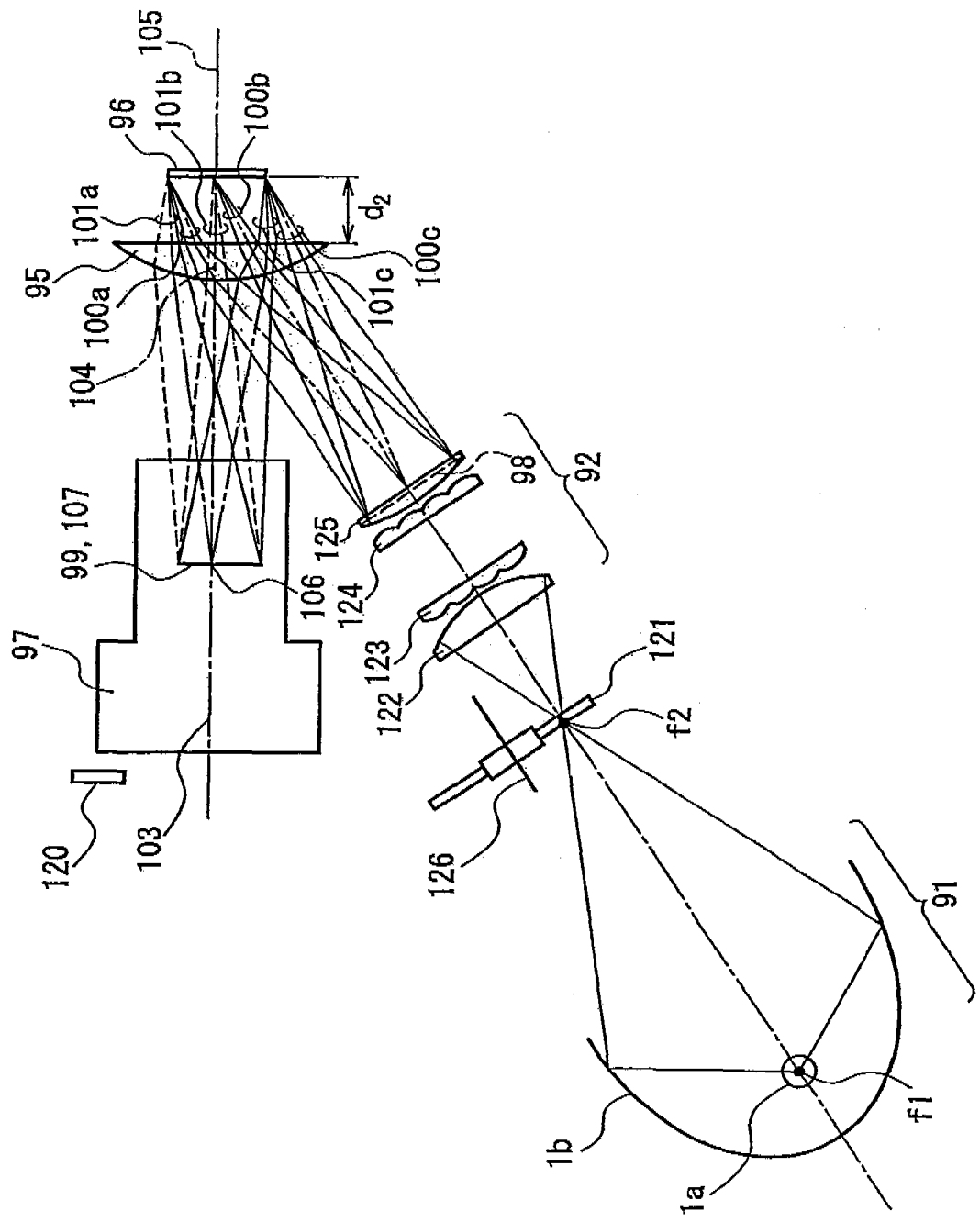
FIG. 9 is a view showing a configuration of a projection type display apparatus according to Embodiment 5 of the present invention.
Figure 10:
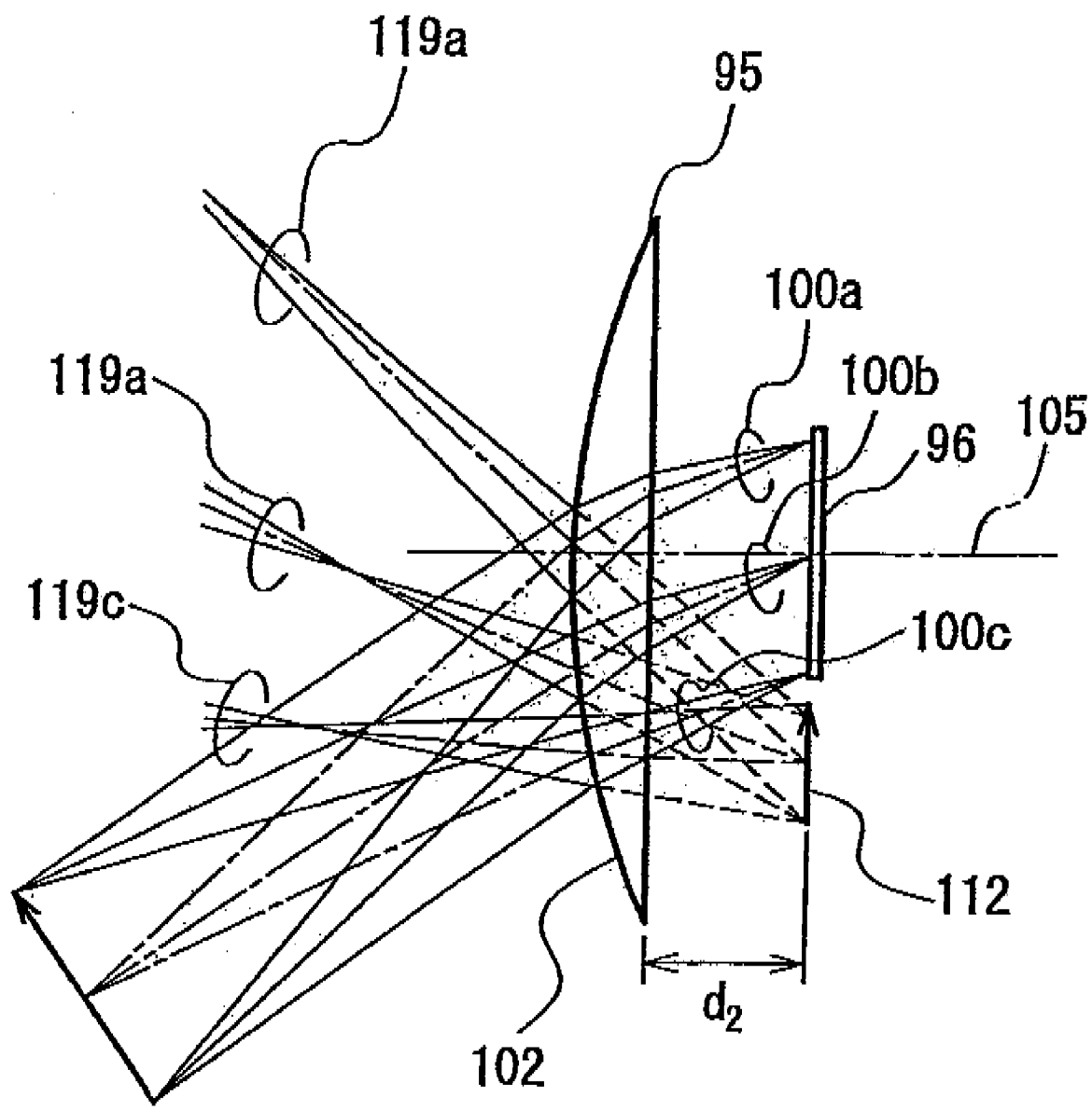
FIG. 10 is a magnified view showing a portion in the vicinity of a reflection type light valve shown in FIG. 9.

Next, a projection type display apparatus according to Embodiment 5 of the present invention will be described with reference to FIGS. 9 and 10. FIG. 9 is a view showing a configuration of the projection type display apparatus according to Embodiment 5 of the present invention. FIG. 10 is a view showing a portion in the vicinity of a reflection type light valve shown in FIG. 9. In Embodiment 5, the DMD shown in FIG. 17 is used as the reflection type light valve. FIGS. 9 and 10 show cross-sections taken along a surface perpendicular to a rotation spindle of micro mirrors constituting the DMD.

First, the configuration and operation of the projection type display apparatus according to Embodiment 5 will be described with reference to FIG. 9. The projection type display apparatus according to Embodiment 5 is different from the projection type display apparatus according to Embodiment 1 in the following point. As shown in FIG. 9, a distance d2 in an optical axis direction of a lens element 95 and a reflection type light valve 96 is set so that the light incident upon the projection lens system 97 from the unnecessary light components of illumination light reflected from the optical interface of the lens element 95 is separated from an effective light component of modulated light output from the reflection type light valve 96.

Furthermore, the projection type display apparatus according to Embodiment 5 has a light-shielding portion 120 on a screen side of the projection lens system 97. Furthermore, the projection type display apparatus according to Embodiment 5 has a color wheel 121, and is different from that according to Embodiment 1 in the configuration of an illumination optical system 92.

The projection type display apparatus according to Embodiment 5 is configured in the same way as that according to Embodiment 1 except for the above points. More specifically, a light source 91, a lens element 95 with a positive power, a reflection type light valve 96, and a projection lens system 97 are the same as those used in Embodiment 1.

Furthermore, the reflection type light valve 96, the projection lens system 97, and the lens element 95 with a positive power are placed in the same way as in Embodiment 1, and optical axes (105, 103, 104) are parallel to and matched with each other. Furthermore, in the same way as in Embodiment 1, an output pupil 98 of the illumination optical system 92 and an entrance pupil 99 of the projection lens system 97 have a conjugate relationship with respect to the lens element 95 with a positive power. In FIG. 9, reference numeral 107 denotes a focal plane of the lens element 95 with a positive power, and 106 denotes a focal point of the lens element 95 with a positive power.

In Embodiment 5, the illumination optical system 92 is configured by successively placing a condenser lens 122, a first lens array 123, a second lens array 124, and a relay lens 125.

In Embodiment 5, the color wheel 121 is placed at a second focal point f2 of a concave mirror 1*b* for condensing light from the light source 91. The color wheel 121 has a configuration in which filters of three colors: R (red), G (green), and B (blue) are arranged successively on a circumference, and light passes through a part thereof. The color wheel 121 is provided with a motor or the like (not shown), whereby the color wheel 121 is rotated at a high speed with respect to an axis 126. Therefore, transmitted light is switched to R, G, and B successively. The light passing through the color wheel 121 is converted to substantially parallel light by the condenser lens 122 having a focal point at the second focal point f2 of the concave mirror 1*b*.

The converted substantially parallel light is incident upon the first lens array 123. The first lens array 123 is composed of a plurality of lens elements with a positive power, and these plurality of lens elements with a positive power respectively have an opening in a shape substantially similar to that of a display region of the reflection type light valve 96. Furthermore, the second lens array 124 also is composed of a plurality of lens elements with a positive power in the same way as the first lens array 123. Thus, the substantially parallel light incident upon the first lens array 123 is split by a plurality of lens elements constituting the first lens array 123 to form an illuminator image on each lens element constituting the second lens array 124 corresponding to the lens elements of the first lens array 123.

The light beams output from the respective lens elements constituting the second lens array 124 pass through the relay lens 125 and the lens element 95 with a positive power in the vicinity of the reflection type light valve 96 to illuminate the reflection type light valve 96. At this time, the light beams output from the respective lens elements of the second lens array 124 are overlapped with each other in the display region of the reflection type light valve 96. The output pupil 98 of the illumination optical system 92 is placed substantially in the vicinity of the second lens array 124 and inside the relay lens 125.

The light beams output from the reflection type light valve 96 are converged by the lens element 95 with a positive power to be incident upon the entrance pupil 99 of the projection lens system 97. Thus, an optical image formed on the reflection type light valve 96 is projected on a screen by the projection lens system 97 in a magnified state.

Next, the principle of separation of an unnecessary light component from an effective light component in Embodiment 5 will be described with reference to FIG. 10. Luminous fluxes condensed by the light source 91, and made uniform and shaped by the illumination optical system 92 are output from the output pupil 98 of the illumination optical system 92, whereby a luminous flux 100a illuminating an upper portion of the reflection type light valve 96, a luminous flux 100b illuminating a central potion of the reflection type light valve 96, and a luminous flux 100c illuminating a lower portion of the reflection type light valve 96 are output.

At this time, as shown in FIG. 10, the luminous fluxes 100a, 100b, and 100c from the output pupil 98 of the illumination optical system 92 in FIG. 10 are partially reflected from the optical interface 102 of the lens element 95 with a positive power to generate luminous fluxes 119a, 119b, and 119c. These fluxes travel to the projection lens system 97. These fluxes are unnecessary light forming a virtual image 112 in the vicinity of the reflection type light valve 96.

However, in Embodiment 5, as described above, the distance d2 between the lens element 95 and the reflection type light valve 96 is set in such a manner that light incident upon the projection lens system 97 from the luminous fluxes 119a, 119b, and 119c generated on the optical interface 102 of the lens element 95 is separated from an effective light component of modulated light output from the reflection type light valve 96. Therefore, generation of unnecessary light in the display region of a screen can be suppressed, and a projected image of excellent quality can be obtained.

Herein, the setting of the distance d2 will be described. When the distance d2 is increased gradually, the positions at which the luminous fluxes 100a, 100b, and 100c of illumination light pass through the lens element 95 are shifted in a downward direction in the figure. Furthermore, along with this, the positions at which the luminous fluxes 119a, 119b, and 119c of reflected light are reflected from the lens element 95 with a positive power also are shifted in a downward direction in the figure.

In this case, the light incident upon the projection lens system 97 among the luminous fluxes 119a, 119b, and 119c is separated gradually from an effective light component of modulated light output from the reflection type light valve 96, and the virtual image 112 also is moved away from the optical axis 105 of the reflection type light valve 96 relatively in a downward direction in the figure.

Because of this, the distance d2 preferably is set so that the virtual image 112 is formed outside of the effective display region of the reflection type light valve 96. In this case, the above-mentioned unnecessary light in the display region of a screen can be further suppressed from being generated, and a projected image of more excellent quality can be obtained.

Furthermore, in Embodiment 5, as described above, a light-shielding portion 120 is provided on a screen side of the projection lens system 97. Therefore, unnecessary light incident upon the projection lens system 97 can be blocked. The light-shielding portion 120 is similar to that shown in Embodiment 4.

In Embodiment 5, the distance from the output pupil 98 of the illumination optical system 92 to the lens element 95 with a positive power and the focal length of the lens element 95 with a positive power are selected appropriately, whereby the surface on which the virtual image 112 is formed can be substantially matched with the display surface of the reflection type light valve 96. In this case, a portion of the display region to be overlapped with the virtual image 112 can be minimized, and the distance d2 between the lens element 95 with a positive power and the reflection type light valve 96 can be decreased. Therefore, the back focus of the projection lens system 97 can be shortened to miniaturize an apparatus.

In Embodiment 5, since the distance d2 is set, the luminous fluxes of output light from the reflection type light valve 96 are increased, compared with those in Embodiment 1. Therefore, in Embodiment 5, it is preferable that the effective diameter of the lens element with a positive power is increased. Furthermore, as described in Embodiment 4, when it is attempted to configure the lens element 95 with a positive power, using one plano-convex lens, a large central thickness is required for ensuring an edge thickness. Thus, in Embodiment 5, in the same way as in Embodiment 1, it is preferable that the lens element 95 with a positive power is formed of a vitreous material having a high refractive index. More specifically, it is preferable that a material having a refractive index of 1.74 to 1.85 is used.

Thus, if the projection type display apparatus according to Embodiment 5 is used, a decrease in quality of a projected image due to an unnecessary light component can be further suppressed, compared with the projection type display apparatus according to Embodiment 1. In Embodiment 5, in the same way as in Embodiment 1, front projection can be realized without using a total reflection prism.

EMBODIMENT 6

Figure 11:
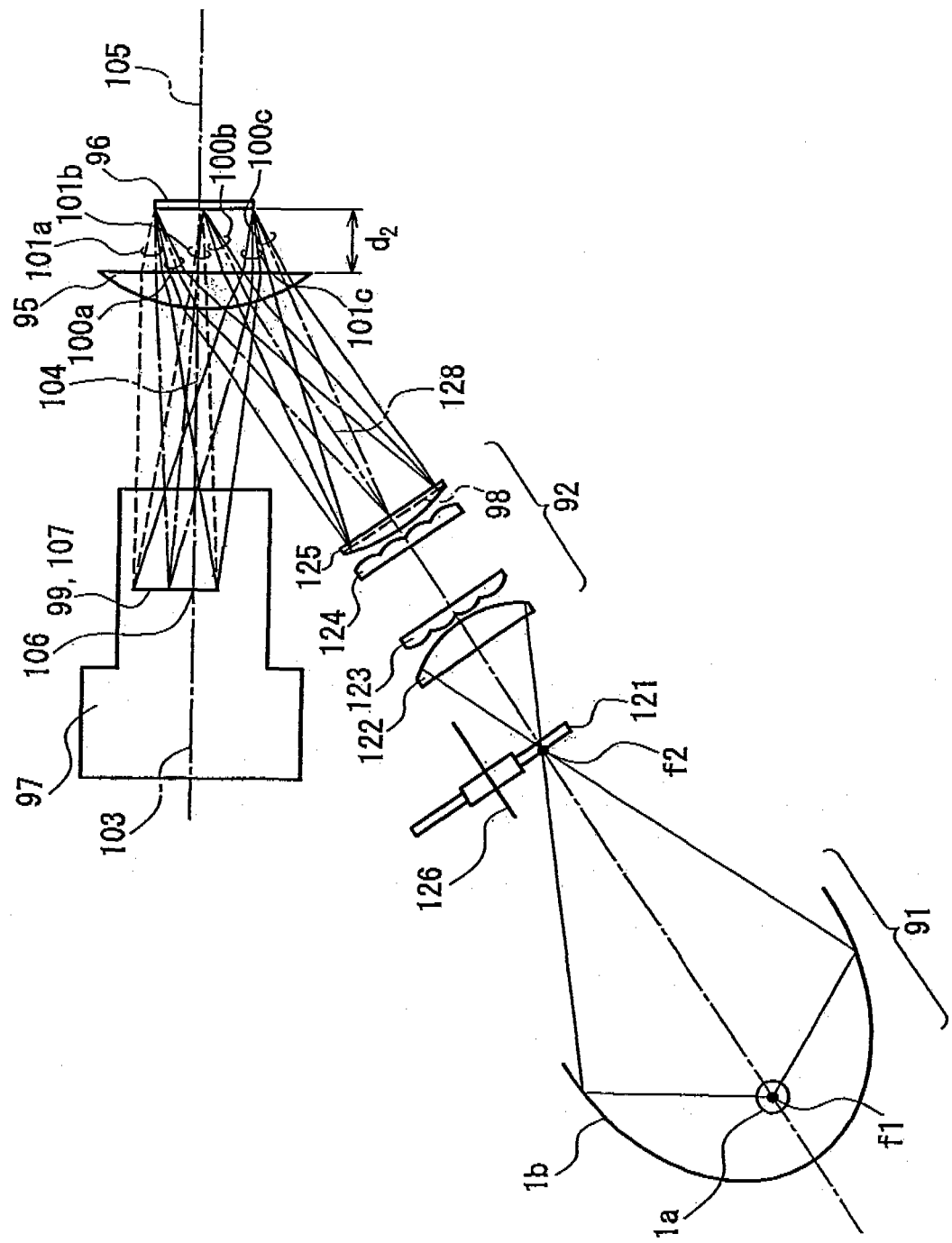
FIG. 11 is a view showing a configuration of a projection type display apparatus according to Embodiment 6 of the present invention.
Figure 12:
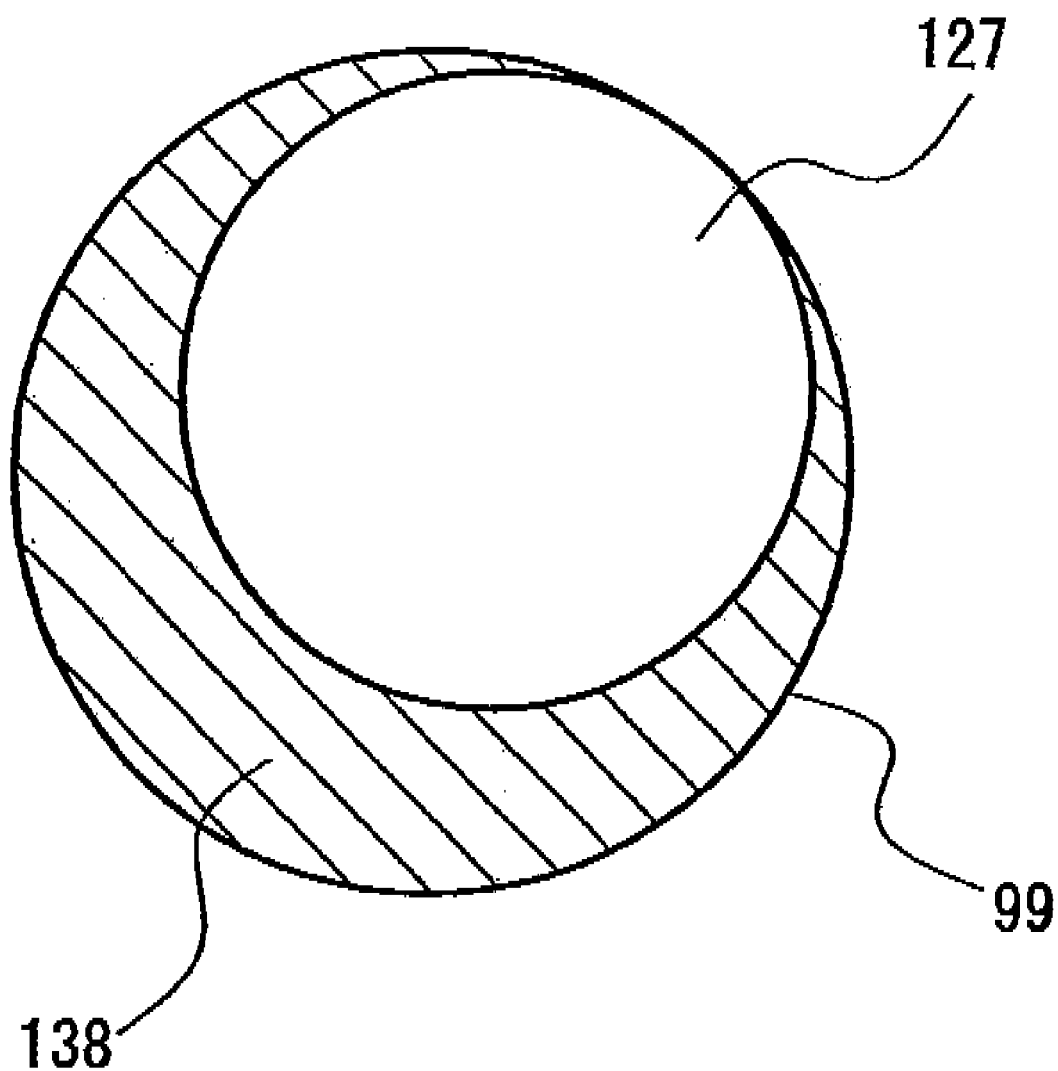
FIG. 12 shows an entrance pupil of a projection lens system constituting the projection type display apparatus shown in FIG. 11.

Next, a projection type display apparatus according to Embodiment 6 of the present invention will be described with reference to FIGS. 11 to 13. FIG. 11 is a view showing a configuration of the projection type display apparatus according to Embodiment 6 of the present invention. FIG. 12 shows an entrance pupil of a projection lens system constituting the projection type display apparatus shown in FIG. 11. In Embodiment 6, as a reflection type light valve, the DMD shown in FIG. 17 is used. FIG. 11 shows a cross-section taken along a surface perpendicular to a rotation spindle of micro mirrors constituting the DMD.

First, the configuration and operation of the projection type display apparatus according to Embodiment 6 will be described with reference to FIG. 11. As shown in FIG. 11, the projection type display apparatus according to Embodiment 6 is different from that according to Embodiment 5 in that the light-shielding portion 120 is not provided on a screen side of the projection lens system 97, and a diaphragm is provided instead. The projection type display apparatus according to Embodiment 6 is the same as that according to Embodiment 5 except for the above point. In FIG. 11, the elements denoted with the same reference numerals as those in FIG. 9 are the same as those shown in FIG. 9.

In the projection type display apparatus according to Embodiment 6, as shown in FIG. 12, a diaphragm 138 deflected with respect to an optical axis 103 of the projection lens system 97 is provided at an entrance pupil 99 of the projection lens system 97. Furthermore, as described later, a second diaphragm (not shown) also is provided. Reference numeral 127 denotes an effective region. Therefore, only a component (effective light component of modulated light) constituting an optical image among illumination light beams reflected from a reflection type light valve 96 passes through the diaphragm 138. This point will be described with reference to FIG. 13.

Figure 13:
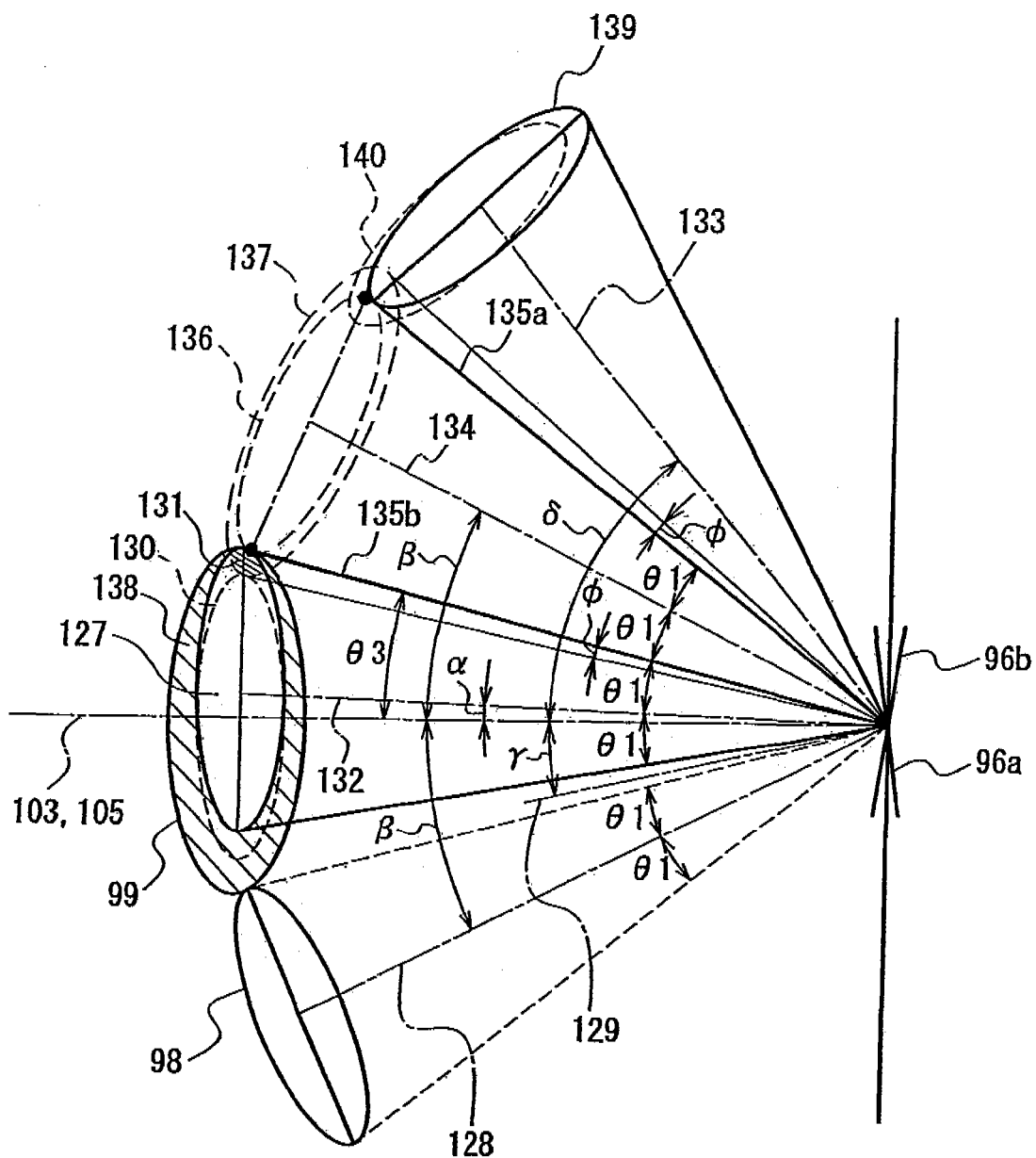
FIG. 13 is a view showing the behavior of a luminous flux in a central portion of a display region of a reflection type light valve shown in FIG. 11.

FIG. 13 shows the behavior of luminous fluxes at a central portion of the display region of the reflection type light valve shown in FIG. 11. FIG. 13 only shows a micro mirror at the center of the display region among those constituting the reflection type light valve. Furthermore, FIG. 13 shows a cross-section taken along a surface perpendicular to a rotation spindle of micro mirrors constituting the DMD. In FIG. 13, reference numeral 96a denotes a micro mirror in an ON state, and 96b denotes a micro mirror in an OFF state. Only the entrance pupil 99 is shown regarding the projection lens system 97.

As shown in FIG. 13, it is assumed that β represents an angle formed by an optical axis 128 of the illumination optical system and an optical axis 105 (an optical axis 103 of the projection lens system 97) of the reflection type light valve 96, and γ represents an angle formed by a normal 129 of the micro mirror in an ON state and the optical axis 105 of the reflection type light valve 96. At this time, an angle α formed by a principal ray 132 of a luminous flux output when the reflection type light valve 96 is in an ON state and the optical axis 105 of the reflection type light valve 96 is represented by the following equation (2).

$$\alpha = \beta - 2\gamma \quad (2)$$

On the other hand, assuming that δ represents an angle formed by a principal ray 133 of a luminous flux 139 output when the reflection type light valve 96 is in an OFF state and the optical axis 105 (the optical axis 103 of the projection lens system 97) of the reflection type light valve, δ is represented by the following Equation (3). The luminous flux output in an OFF state becomes unnecessary light.

$$\delta = 4\gamma + \alpha \quad (3)$$

In order to enhance the quality of a projected image, it is required to prevent unnecessary light from being incident upon the entrance pupil 99 of the projection lens system 97 to generate stray light inside the lens or to prevent unnecessary light from reaching a screen. Therefore, from the above-mentioned Equation (3), assuming that the angle α is 0 or more, δ becomes large. As a result, the luminous flux output when the reflection type light valve 96 is in an OFF state is shifted as follows: a luminous flux placed at a position of a luminous flux 140 when the angle α is 0 is shifted to a position of a luminous flux 139. Thus, the principal ray 133 becomes away from the entrance pupil 99 of the projection lens system, whereby the above-mentioned unnecessary light can be prevented from being incident upon the entrance pupil 99.

Furthermore, when the principal ray 132 of the luminous flux output when the reflection type light valve 96 is in an ON state is matched with the optical axis 105 of the reflection type light valve, i.e., in the case where α is 0°, the effective region is represented by a broken line 130. However, when the principal ray 132 is tilted (α>0), the effective region is shifted upward in the figure. In this case, the effective region is denoted with reference numeral 127 shown in FIG. 12. Thus, in the present embodiment, a region other than the effective region 127 in the entrance pupil 99 of the projection lens system is provided with the diaphragm 138 so as not to transmit unnecessary light, thereby blocking light.

Furthermore, light reflected from a transparent substrate provided on the surface of the reflection type light valve also becomes unnecessary light. An angle formed by the principal ray 134 of the unnecessary light and the optical axis 105 (the optical axis 103 of the projection lens system 97) of the reflection type light valve also becomes β. Thus, by setting the angle α to be 0° or more, the angle β formed by the principal ray 134 of the unnecessary light and the optical axis 105 (the optical axis 103 of the projection lens system 97) of the reflection type light valve also becomes large, and the unnecessary light also can be suppressed from being incident upon the entrance pupil 99 of the projection lens system.

In the display region (not shown) of the reflection type light valve 96, pixels composed of micro mirrors, driving signal lines, pixel electrodes, and the like are formed periodically. As the definition of a projected image is being enhanced, the number of effective pixels on the reflection type light valve 96 also is increased. Therefore, as long as the size of the reflection type light valve 96 is not enlarged, the size of the pixels (micro mirrors) on the reflection type light valve 96 is decreased, and the pitch of the pixels also is decreased.

Furthermore, in general, by decreasing the size of the reflection type light valve, the cost of the reflection type light valve and an optical system using the same can be reduced. Therefore, the reflection type light valve preferably may be miniaturized. Accordingly, it is considered that there is a high possibility that the size and pitch of pixels will be decreased further.

Herein, the case will be considered where light is incident upon an object having a periodical configuration such as the reflection type light valve shown in FIG. 17. In general, when light is incident upon the object having a minute periodical configuration, the object having a periodical configuration functions as a diffraction grating, whereby diffracted light such as 0th order light, 1st order light, 2nd order light, . . . is generated. In the case where a diffraction grating is formed of a reflection surface, reflected light becomes diffracted light. The diffracted light is generated with an intensity distribution in a discrete manner in accordance with the order, and the diffracted light of each order satisfies the following Equation (4). In Equation (4), θ represents an angle of incident light with respect to an optical axis, θ' represents an angle of output light with respect to an optical axis, n represents a diffraction order as an integer, λ represents a wavelength, and d3 represents a pitch of a periodical structure.

$$(n\lambda)/d3 = \sin\theta - \sin\theta' \quad (4)$$

Thus, in the reflection type light valve shown in FIG. 17, the unnecessary light generated by being reflected from a transparent substrate of the reflection type light valve is output not only as a luminous flux 136 having a spread angle of θ1 in the direction of axes 135a and 135b with respect to the principal ray 134, but also as the diffracted light generated due to the above-mentioned minute periodical configuration. In the diffracted light, the luminous fluxes of 1st order light generated outside of 0th order light are output in a discrete manner with respect to the axes 135a and 135b positioned on the outermost periphery of the luminous flux 136 and overlapped with each other to be output as a luminous flux 137 having a spread angle larger than θ1.

The light with the largest intensity in the above-mentioned diffracted light is 1st order diffracted light. The 1st order diffracted light is output with a spread angle of φ represented by the following Equation (5).

$$\sin\phi = \lambda/d \quad (5)$$

Thus, the luminous flux 137 generated by being reflected from a transparent substrate is output at an angle of (θ1+φ) including the spread angle θ1 of the luminous flux 136 from the above-mentioned Equation (5).

On the other hand, as is understood from FIG. 13, β also satisfies the relationship represented by the following Equation (6). θ1 represents a spread angle of light incident upon the projection lens system by being reflected from the reflection type light valve 96 as described above.

$$\beta = 2\theta 1 + \alpha \quad (6)$$

Thus, as shown in FIG. 13, a part of the effective light component (ON light) of modulated light output from the reflection type light valve 96 is overlapped with the luminous flux 137 of unnecessary light, and a part of the luminous flux 137 of unnecessary light passes through the effective region 127. Therefore, in Embodiment 6, as shown in FIG. 13, a second diaphragm 131 is provided so as to shield a part of the effective region 127 against light, whereby a part of the luminous flux 137 does not pass therethrough. Furthermore, it is preferable that the second diaphragm 131 is formed along an outside shape of the luminous flux 137 so that an angle formed by a line connecting an end on the most optical axis 105 side to the micro mirror 96a with respect to the optical axis 105 becomes (θ3−φ) or (θ1+α−φ).

Furthermore, in Embodiment 6, the entrance pupil 99 needs to include the effective region 127, as shown in FIG. 13. Thus, the F-number F1 of the projection lens system preferably satisfies the following Equation (1).

$$F1 = 1/(2 \sin(\theta 1 + \alpha)) \quad (1)$$

For example, in the case where a pixel pitch of the reflection type light valve is about 14 μm, the 1st order diffracted light is generated in a range where a spread angle is enlarged by about 2.4° (φ=2.4°) with respect to the luminous flux 136. Therefore, it is preferable that the effective entrance pupil (effective region 127) is deflected at an angle (α) larger than 2.4° with respect to the optical axis 103. Furthermore, in this case, assuming that a tilt angle of the micro mirrors (96a, 96b) is ±10°, the F-number F1 of the projection lens system becomes about 2.4 from the above-mentioned Equation (1), with respect to about 3 in the absence of deflection.

As described above, in the projection type display apparatus according to Embodiment 6, the deflected diaphragm 138 and the second diaphragm 131 are provided at the entrance pupil 99 of the projection lens system, whereby luminous fluxes forming an image from the reflection type light valve are allowed to pass through these diaphragms. More specifically, in Embodiment 6, the angle α formed by the principal ray 132 of the luminous flux output when the reflection type light valve is in an "ON state" and the optical axis 105 of the reflection type light valve is set to be larger than 0°.

Thus, if the projection type display apparatus according to Embodiment 6 is used, unnecessary light such as OFF light and light reflected from a transparent substrate can be suppressed from being incident upon the entrance pupil 99 of the projection lens system, whereby the quality of a projected image can be enhanced. In the present embodiment, the diaphragm 138 has a circular shape. However, the present embodiment is not limited thereto. The diaphragm 138 may have, for example, an oval shape.

Thus, if the projection type display apparatus according to Embodiment 6 is used, a decrease in quality of a projected image due to an unnecessary light component can be further suppressed, compared with the projection type display apparatus according to Embodiment 1. In Embodiment 6, in the same way as in Embodiment 1, front projection can be realized without using a total reflection prism.

Furthermore, since the projection lens system is provided with the deflected diaphragm 138 and the second diaphragm 131, it is not preferable that a lens or a lens group provided with a diaphragm is rotated so as to adjust a focal point in a forward and backward direction by this rotation. Therefore, in Embodiment 6, as means for adjusting a focal point of the projection lens system, it is preferable to adjust a focal point only by moving a lens group in an optical axis direction without rotating them. In particular, it is preferable to adjust a focal point by moving only a front lens group constituting the projection lens system.

A specific example includes means for adjusting a focal point using a forwarding helicoid. If a focal point is adjusted by rotating only a lens group without being provided with a deflected diaphragm, it is preferable to use such means for adjusting a focal point.

Furthermore, in Embodiment 6, in the same way as in Embodiment 5, the lens element 95 with a positive power is made of a vitreous material with a high refractive index. More specifically, it is preferable to use a material having a refractive index of 1.74 to 1.85.

EMBODIMENT 7

Figure 14:
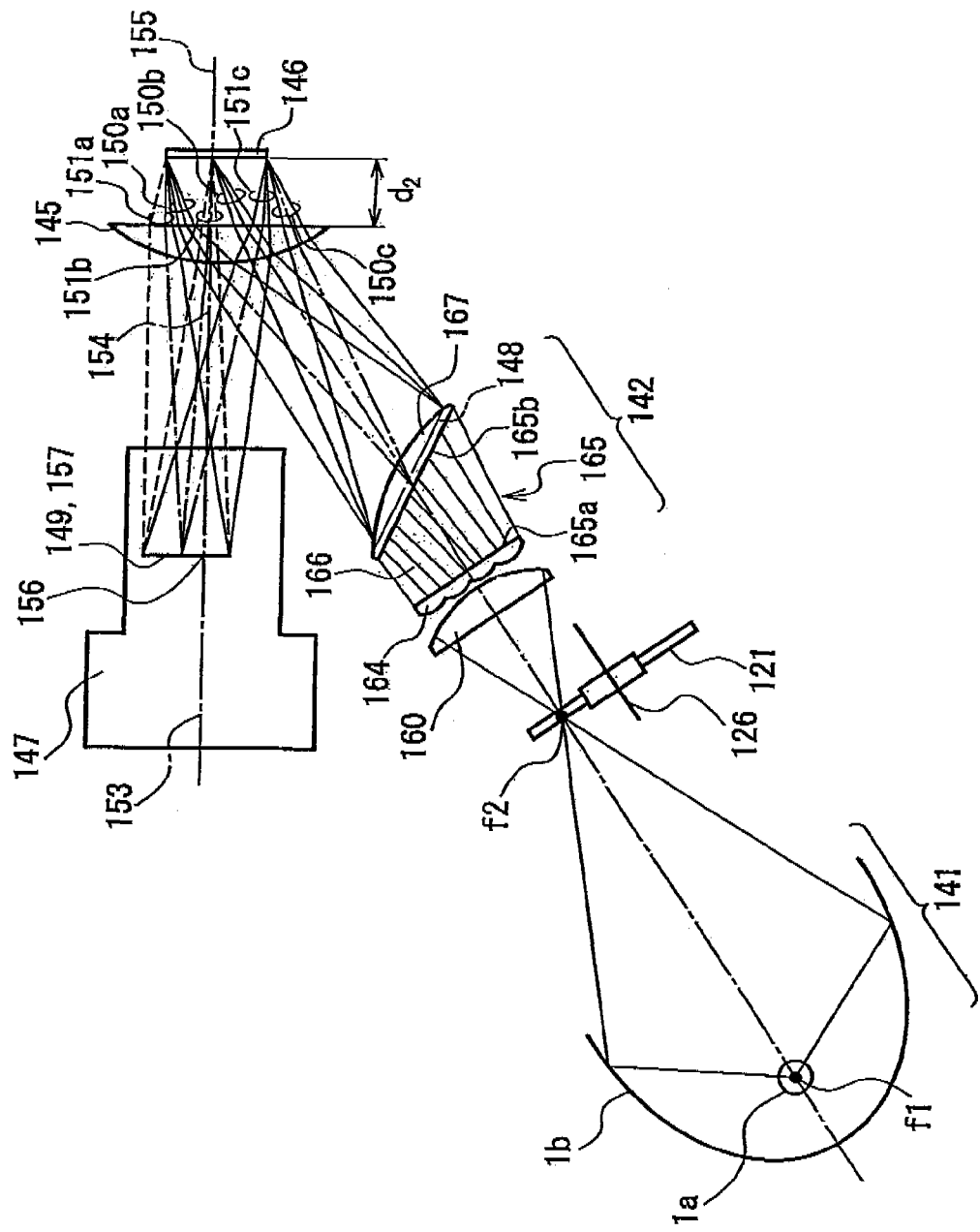
FIG. 14 shows a configuration of a projection type display apparatus according to Embodiment 7 of the present invention.

Next, a projection type display apparatus according to Embodiment 7 of the present invention will be described with reference to FIG. 14. FIG. 14 is a view showing a configuration of the projection type display apparatus according to Embodiment 7 of the present invention. In Embodiment 7, as a reflection type light valve, the DMD shown in FIG. 17 is used. FIG. 14 shows a cross-section taken along a surface perpendicular to a rotation spindle of micro mirrors constituting the DMD.

As shown in FIG. 14, the projection type display apparatus according to Embodiment 7 is configured in the same way as in Embodiment 6, except for the configuration of an illumination optical system 142. More specifically, a light source 141, a lens element 145 with a positive power, a reflection type light valve 146, and a projection lens system 147 are the same as those in Embodiment 6, and are placed in the same way as in Embodiment 6.

In Embodiment 7, the illumination optical system 142 has a configuration in which a condenser lens 160, a lens array 164 for splitting a luminous flux, a light guide 165 configured by stacking a plurality of optical fibers 166, and a relay lens 167 are placed successively.

Therefore, substantially parallel light passing through a color wheel 121 and converted by the condenser lens 160 passes through the lens array 164 to be incident upon the respective optical fibers 166 constituting the light guide 165. Light incident upon the respective optical fibers 166 repeat reflection inside the fibers to be output.

In the projection type display apparatuses according to Embodiments 1 to 5, each element (e.g., the relay lens system 4 of the illumination optical system 2) of the illumination optical system is perpendicular to the optical axis of the illumination optical system. However, the illumination optical system is placed so that its optical axis is tilted with respect to the optical axis of a lens with a positive power and the optical axis of a reflection type light valve. Therefore, according to the "Shineproof Theorem", the shape of illumination light reaching the reflection type light valve may be a tilted rectangle of a rhombus, a trapezoid, or the like. In this case, light output from the reflection type light valve has its luminous flux density increased downward in the figure, and a luminous flux distribution become nonuniform.

Furthermore, when luminous fluxes 151a, 151b, and 151c of light output from the reflection type light valve 146 pass through the lens element 146 with a positive power, these fluxes are refracted. The diffraction direction and diffraction force thereof are varied depending upon which portion of the display region of the reflection type light valve 146 these fluxes are reflected from. Therefore, in an entrance pupil 149 of the projection lens system 147, there is a possibility that a luminous flux density also is increased downward in the figure, and a luminous flux distribution becomes nonuniform.

When such a nonuniform luminous flux distribution occurs, a partial region of an output pupil 148 of the illumination optical system 142 and a partial region in the entrance pupil 149 of the projection lens system 147 cannot keep a conjugate relationship with respect to the lens with a positive power, which may result in nonuniform brightness of a projected image.

Therefore, in Embodiment 7, as described above, the illumination optical system 142 is configured using the light guide 165. The light guide 165 is configured by stacking a plurality of optical fibers 166, and the output pupil 148 of the illumination optical system 142 is composed of output light from the plurality of optical fibers 166 placed so that the plane of incidence of each optical fiber is disposed two-dimensionally. Thus, the output pupil 148 of the illumination optical system 142 has a plurality of partial pupil elements, and the shape of the output pupil 148 becomes a plane obtained by connecting a plurality of partial pupil elements. In the present embodiment, this plane may be a free-curved plane.

Furthermore, as shown in FIG. 14, a plurality of optical fibers 166 are arranged uniformly on a plane of incidence 165a of the light guide 165, and arranged nonuniformly on an output plane 165b. In the example shown in FIG. 14, the density of the optical fibers 166 is decreased downward in the figure on the output plane 165b. Therefore, the luminous flux distribution of illumination light output from the illumination optical system 142 is nonuniform at a time of output; however, it becomes uniform when reflected from the reflection type light valve. More specifically, according to the "Shineproof Theorem", the shape of illumination light reaching the reflection type light valve 146 is suppressed from becoming a tilted rectangle.

Thus, the entire or substantially entire region of the entrance pupil 149 of the projection lens system 147 and the entire or substantially entire region of the output pupil 148 of the illumination optical system 142 satisfy a satisfactory conjugate relationship, and the illumination light output from the output pupil 148 of the illumination optical system 142 passes through the entrance pupil 149 of the projection optical system 147 to a maximum degree.

In Embodiment 7, the entrance pupil 149 of the projection lens system 147 and the output pupil 148 of the illumination optical system 142 are placed so as to have a conjugate relationship with respect to the lens element 145 with a positive power. Therefore, according to the "Shineproof Theorem", by appropriately controlling the luminous flux distribution of the output pupil 148 of the illumination optical system 142, the luminous flux distribution on the entrance pupil 149 of the projection lens system 147 can be made uniform, whereby a projected image with uniform brightness can be obtained.

In the present embodiment, the illumination optical system 142 is not limited to the embodiment using the light guide 165. The illumination optical system 142 may have a configuration in which a plurality of lens arrays composed of a plurality of lens elements with a positive power are placed instead of the light guide 165. In this configuration, as the lens elements with a positive power constituting the lens arrays, those which have different focal lengths are used, whereby a luminous flux distribution of illumination light output from the illumination optical system can be controlled appropriately. In this embodiment, the luminous flux distribution of illumination light reflected from the reflection type light valve can be made uniform. Furthermore, the illumination optical system 142 shown in Embodiment 7 also can be used as an illumination optical system of a projection type display apparatus according to another embodiment.

Furthermore, in Embodiment 7, the projection lens system 147 is provided with the diaphragms (the diaphragm 138 and the second diaphragm 131 shown in FIG. 13) having the similar configurations to those shown in Embodiment 6. Therefore, it is required that the illumination optical system 142 is placed so that a light component forming an optical image among illumination light beams reflected from the reflection type light valve 146 passes through these diaphragms. Furthermore, in this case, the F-number of the projection lens system preferably satisfies the above-mentioned Equation (1) in the same way as in Embodiment 6.

In Embodiment 7, the lens element 145 with a positive power preferably is made of a vitreous material with a high refractive index, in the same way as in Embodiment 5. Specifically, it is preferable to use a material with a refractive index of 1.74 to 1.85.

In the projection type display apparatus of the present invention, a plurality of reflection type light valves can be used. In this case, a color separation optical system for allowing monochrome light to be incident upon each reflection type light valve, and a color combination optical system for combining light output from each reflection type light valve are required.

Furthermore, in the projection type display apparatus of the present invention, the movable range of micro mirrors constituting the respective pixels of the reflection type light valve is not limited to ±10°. According to the present invention, the movable range of the micro mirrors should be set in accordance with the characteristics of the reflection type light valve to be used so that an optimum light output and a high contrast are obtained.

Furthermore, in the projection type display apparatus of the present invention, the respective pixels of the reflection type light valve are not limited to the embodiment composed of micro mirrors to be operated. In the projection type display apparatus of the present invention, the reflection type light valve may be used, in which the light incident direction is different from the light output direction and the output direction can be controlled.

EMBODIMENT 8

Figure 15:
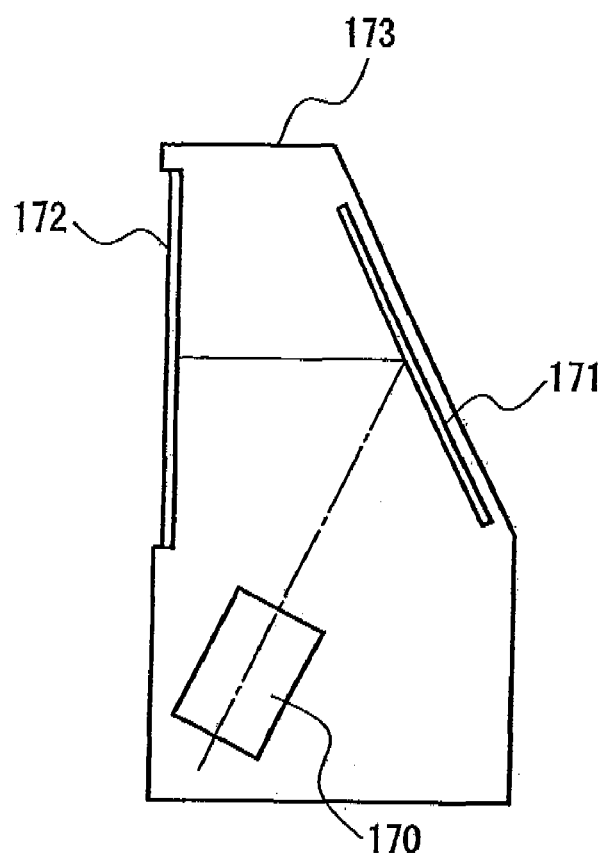
FIG. 15 is a view showing a configuration of an example of a rear projector of the present invention.

FIG. 15 is a view showing a configuration of an example of a rear projector of the present invention. As shown in FIG. 15, the rear projector is composed of a projection type display apparatus 170 shown in any of Embodiments 1 to 7, a mirror 171 for reflecting light projected from the projection type display apparatus 170, a screen 172 for allowing light reflected from the mirror 171 to be transmitted and scattered to display it, and a housing 173 accommodating these elements.

Thus, the rear projector shown in FIG. 15 uses a projection type display apparatus shown in any of Embodiments 1 to 7. Therefore, the rear projector can be miniaturized and decreased in cost, and a projected image of satisfactory quality can be displayed.

EMBODIMENT 9

Figure 16:
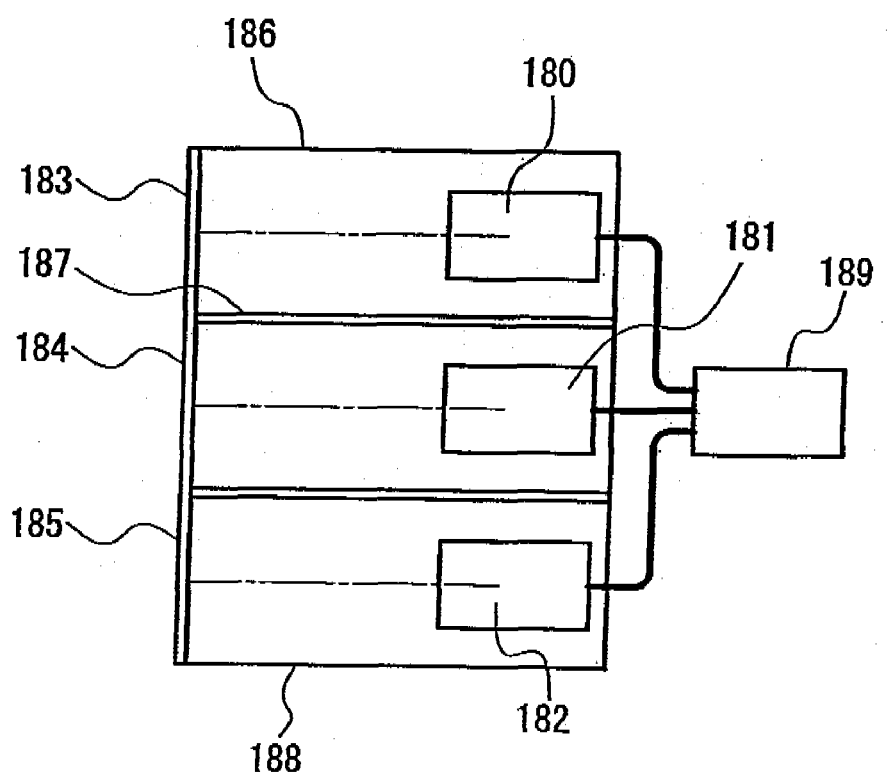
FIG. 16 is a view showing a configuration of an example of a multi-vision system of the present invention.

FIG. 16 is a view showing a configuration of an example of a multi-vision system of the present invention. As shown in FIG. 16, the multi-vision system has a plurality of projection systems and a video signal dividing circuit 189. Each projection system is composed of a projection type display apparatus (180 to 182) shown in any of Embodiments 1 to 7, a transmission type screen (183 to 185), and a housing (186 to 188).

The video signal dividing circuit 189 divides a screen into a plurality of regions, processes a video signal in each region and supplies it to the projection type display apparatuses 180, 181, and 182 constituting each projection system. Therefore, the respective images projected from the projection type display apparatuses 180, 181, and 182 are formed on the corresponding transmission type screens 183, 184, and 185 to constitute one image as a whole. Thus, according to the multi-vision system of the present embodiment, a compact set with a short depth can be realized while having a large screen.

Furthermore, it may be possible that two of the transmission type screens 183 to 185 display one image as a whole, and the remaining screen displays another image. Furthermore, in order to obtain a visual effect, the same image may be displayed on the respective transmission type screens. Furthermore, in order to provide various pieces of information at a time, different contents may be displayed on the respective transmission type screens.

The projection type display apparatuses 180, 181, and 182 may process color information such as brightness, chromaticity, color saturation, and the like of a signal divided by the video signal dividing circuit 189, in accordance with the light output at the commencement of lighting and color reproducibility. In this case, even images projected separately from the projection type display apparatuses 180, 181, and 182 can be displayed as one screen with high uniformity.

INDUSTRIAL APPLICABILITY

As described above, according to the present invention, a lens element with a positive power can be placed in the vicinity of a display region of a reflection type light valve, so that a virtual image of an output pupil of an illumination optical system is not formed in an effective display region. Therefore, even in a telecentric optical system, the effective diameter of an entrance pupil of a projection lens system and an output pupil of an illumination optical system can be made small, and optical paths of incident light and output light can be separated from each other in a compact configuration. Therefore, it is not required to use means for separating illumination light from projected light, such as a conventionally used total reflection prism splitter. Thus, front projection can be performed in a telecentric optical system while reducing a cost, and the image quality in a projected plane can be made homogeneous.

More specifically, in the projection type display apparatus of the present invention, a compact display optical system of high image quality using a reflection type light valve can be realized. Furthermore, the projection type display apparatus of the present invention is capable of ensuring a homogeneous image by front projection. Furthermore, since there is no prism, a bright image of high quality with a satisfactory contrast can be obtained, while it is attempted to reduce a cost.

The invention claimed is:

1. The projection type display apparatus comprising: an illumination optical system for collecting light radiated from a light source to form illumination light; a reflection type light valve for reflecting the illumination light to output modulated light forming an optical image; a projection lens system for projecting the optical image formed by the reflection type light valve; and a lens element with a positive power, wherein the lens element is composed of one plano-convex lens, and is placed between the reflection type light valve and the projection lens system with a convex surface directed to the protection lens system, in such a manner that the illumination light passes through the lens element to illuminate the reflection type light valve, and the modulated light output from the reflection type light valve passes through the lens element to be incident upon the projection lens system, and wherein an output pupil of the illumination optical system and an entrance pupil of the projection lens system have a substantially conjugate relationship with respect to the lens element, and 80% or more of a luminous flux reflected from a display region of the reflection type light valve among luminous fluxes passing through the output pupil of the illumination optical system passes through the lens element to be incident upon an effective region of the entrance pupil of the projection lens system.

2. A projection type display apparatus comprising: an illumination optical system for collecting for collecting light radiated from a light source to form illumination light; a reflection type light valve for reflecting the illumination light to output modulated light forming an optical image; a projection lens system for projecting the optical image formed by the reflection type light valve; and a lens element with a positive power, wherein the lens element has a plurality of projections on one optical interface or both optical interfaces and is placed between the reflection type light valve and the projection lens system so that the illumination light passes through the lens element to illuminate the reflection type light valve, and modulated light output from the reflection type light valve passes through the lens element to be incident upon the projection lens system, and the plurality of projections are formed so that a pitch is ½ or less of a visible band wavelength and a height is one time or more of the pitch.

3. The projection type display apparatus according to claim 2, wherein the plurality of projections have an axial cross-section that is increased in size gradually from a tip end portion to a bottom portion.

4. The projection type display apparatus according to claim 2, wherein the reflection type light valve, the projection lens system, and the lens element with a positive power are placed so that their optical axes are parallel to and matched with each other.

5. The projection type display apparatus according to claim 2, wherein the projection lens system and the lens element are placed so that their optical axes are matched with each other, the projection lens system has a diaphragm deflected with respect to the optical axis thereof, and the illumination optical system is placed so that the modulated light passes through the diaphragm.

6. The projection type display apparatus according to claim 5, wherein the diaphragm is deflected in a direction away from an optical axis of the illumination optical system.

7. The projection type display apparatus according to claim 5, wherein the projection lens system has means for adjusting a focal point only by movement in a direction of the optical axis thereof.

8. The projection type display apparatus according to claim 5, satisfying the following Equation (1):

$$F1=1/(2\sin(\theta1+\alpha)) \qquad (1)$$

where F1 is an F-number of the projection lens system, $\theta1$ is a spread angle of light that is output from the illumination optical system and reflected from the reflection type light valve to be incident upon the projection lens system, and a is an angle formed by a principal ray output from a center of a display region of the reflection type light valve and an optical axis of the projection lens system.

9. The projection type display apparatus according to claim 2, wherein the illumination optical system has an output pupil formed of a plurality of partial pupil elements and is configured so that a luminous flux distribution of the illumination light becomes uniform when reflected from the reflection type light valve.

10. The projection type display apparatus according to claim 2, wherein an output pupil of the illumination optical system and an entrance pupil of the projection lens system have a substantially conjugate relationship with respect to the lens element, and
    80% or more of a luminous flux reflected from a display region of the reflection type light valve among luminous fluxes passing through the output pupil of the illumination optical system passes through the lens element to be incident upon an effective region of the entrance pupil of the projection lens system.

11. A projection type display apparatus comprising: an illumination optical system for collecting for collecting light radiated from a light source to form illumination light; a reflection type light valve for reflecting the illumination light to output modulated light forming an optical image; a projection lens system for projecting the optical image formed by the reflection type light valve; and a lens element with a positive power,
    wherein the reflection type light valve and the projection lens system are placed so that their optical axes are parallel to each other,
    the lens element is configured by cementing a plano-concave lens with a plano-convex lens with a refractive index larger than that of the piano-concave lens and is placed between the reflection type light valve and the projection lens system so that the illumination light passes through the lens element to illuminate the reflection type light valve, and modulated light output from the reflection type light valve passes through the lens element to be incident upon the projection lens system, and
    the plano-concave lens and the plano-convex lens are cemented with each other via a film having a refractive index larger than that of the piano-concave lens and smaller than that of the piano-convex lens, or a film whose refractive index is varied from that of the plano-concave lens to that of the plano-convex lens.

12. The projection type display apparatus according to claim 11, wherein the projection lens system and the lens element are placed so that their optical axes are matched with each other, the projection lens system has a diaphragm deflected with respect to the optical axis thereof, and the illumination optical system is placed so that the modulated light passes through the diaphragm.

13. The projection type display apparatus according to claim 12, wherein the diaphragm is deflected in a direction away from an optical axis of the illumination optical system.

14. The projection type display apparatus according to claim 12, wherein the projection lens system has means for adjusting a focal point only by movement in a direction of the optical axis thereof.

15. The projection type display apparatus according to claim 12, satisfying the following Equation (1):

$$F1=1/(2\sin(\theta1+\alpha)) \qquad (1)$$

where F1 is an F-number of the projection lens system, $\theta1$ is a spread angle of light that is output from the illumination optical system and reflected from the reflection type light valve to be incident upon the projection lens system, and $\alpha$ is an angle formed by a principal ray output from a center of a display region of the reflection type light valve and an optical axis of the projection lens system.

16. The projection type display apparatus according to claim 11, wherein the illumination optical system has an output pupil formed of a plurality of partial pupil elements and is configured so that a luminous flux distribution of the illumination light becomes uniform when reflected from the reflection type light valve.

17. The projection type display apparatus according to claim 11, wherein an output pupil of the illumination optical system and an entrance pupil of the projection lens system have a substantially conjugate relationship with respect to the lens element, and
    80% or more of a luminous flux reflected from a display region of the reflection type light valve among luminous fluxes passing though the output pupil of the illumination optical system passes though the lens element to be incident upon an effective region of the entrance pupil of the projection lens system.

18. A rear projector comprising the projection type display apparatus of claim 11, a mirror for reflecting light projected from the projection type display apparatus, and a screen for transmitting and scattering light reflected from the mirror to display it.

19. A multi-vision system comprising a plurality of projection systems and a video signal dividing circuit for supplying a video signal to each of the plurality of projection systems,
    wherein each of the plurality of projection systems is composed of the projection type display apparatus of claim 11, a transmission type screen for displaying light projected from the projection type display apparatus, arid a housing for accommodating the projection type display apparatus, and
    the video signal dividing circuit divides a screen into a plurality of regions, processes a video signal in each of the regions, and supplies the video signal to the projection system.

* * * * *